US012701555B2

(12) United States Patent
Wu et al.

(10) Patent No.: US 12,701,555 B2
(45) Date of Patent: Aug. 4, 2026

(54) METHOD FOR DETERMINING CONFLICTING RESOURCE, TERMINAL, AND NETWORK DEVICE

(71) Applicant: VIVO MOBILE COMMUNICATION CO., LTD., Dongguan (CN)

(72) Inventors: Kai Wu, Dongguan (CN); Xueming Pan, Dongguan (CN); Xiaodong Shen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 533 days.

(21) Appl. No.: 17/965,726

(22) Filed: Oct. 13, 2022

(65) Prior Publication Data

US 2023/0034859 A1 Feb. 2, 2023

Related U.S. Application Data

(63) Continuation of application No. PCT/CN2021/087196, filed on Apr. 14, 2021.

(30) Foreign Application Priority Data

Apr. 15, 2020 (CN) .......................... 202010296709.6
Apr. 27, 2020 (CN) .......................... 202010345796.X
May 15, 2020 (CN) .......................... 202010414589.5

(51) Int. Cl.
*H04W 72/04* (2023.01)
*H04W 72/0446* (2023.01)

(52) U.S. Cl.
CPC ................................ *H04W 72/0446* (2013.01)

(58) Field of Classification Search
None
See application file for complete search history.

(56) References Cited

U.S. PATENT DOCUMENTS 12,127,224 B2 * 10/2024 Ai ..................... H04W 72/0446
2017/0303240 A1 * 10/2017 Basu Mallick ....... H04W 72/12
(Continued)

FOREIGN PATENT DOCUMENTS

CN 102869112 A 1/2013
CN 102932907 A 2/2013
(Continued)

OTHER PUBLICATIONS

International Search Report issued in corresponding International Application No. PCT/CN2021/087196, mailed Jul. 19, 2021, 4 pages.

(Continued)

*Primary Examiner* — Abdullahi Ahmed
*Assistant Examiner* — Ahmed Saifuddin
(74) *Attorney, Agent, or Firm* — IPX PLLC

(57) ABSTRACT

A method for determining a conflicting resource, a terminal, and a network device are provided. The method, performed by the terminal and includes: determining, based on activation information of a secondary cell, whether there is a conflicting time resource in a plurality of serving cells of the terminal. The plurality of serving cells include the secondary cell. The conflicting time resource refers to: a time resource is configured as uplink and downlink respectively in different serving cells. The activation information includes at least one of the following: a state of the secondary cell or a command receiving time. The state of the secondary cell includes: an active state or a deactivated state. The command receiving time is a receiving time of an activation command or a deactivation command of the secondary cell.

16 Claims, 4 Drawing Sheets

Start

Determine, based on activation information of a secondary cell of a terminal, whether there is a conflicting time resource in a plurality of serving cells of the terminal — 301

End

(56)        References Cited

U.S. PATENT DOCUMENTS

| 2018/0219654 | A1* | 8/2018 | Chen ......................... H04L 5/16 |
|---|---|---|---|
| 2019/0230701 | A1* | 7/2019 | Golitschek Edler Von Elbwart et al. ....... H04L 1/0061 |
| 2019/0261454 | A1* | 8/2019 | Xiong ................... H04L 5/0094 |
| 2020/0351931 | A1* | 11/2020 | Babaei ............... H04W 52/365 |
| 2021/0167928 | A1* | 6/2021 | Xiao ..................... H04L 1/1896 |
| 2021/0307016 | A1* | 9/2021 | Takeda ............. H04W 72/0446 |
| 2022/0271909 | A1* | 8/2022 | Abotabl ................... H04L 5/14 |
| 2022/0353887 | A1* | 11/2022 | Xu ........................ H04L 1/0068 |

FOREIGN PATENT DOCUMENTS

| CN | 109495971 | A | 3/2019 |
|---|---|---|---|
| CN | 110062387 | A | 7/2019 |
| CN | 110249677 | A | 9/2019 |
| EP | 2916583 | A1 | 9/2015 |
| WO | 2020016934 | A1 | 1/2020 |

OTHER PUBLICATIONS

Extended European Search Report issued in related European Application No. 21788220.8, mailed Aug. 22, 2023, 10 pages.

VIVO, "Remaining issues on Half-Duplex Operation in CA", 3GPP Draft, R1-2003423, May 2020, 3 pages.

* cited by examiner

Start

Determine, based on activation information of a secondary cell of a terminal, whether there is a conflicting time resource in a plurality of serving cells of the terminal — 301

End

— 400

Determining module — 401

Terminal

— 400

Determining module — 401

Determining module — 402

Terminal

600

601

600

601

602

METHOD FOR DETERMINING CONFLICTING RESOURCE, TERMINAL, AND NETWORK DEVICE

CROSS-REFERENCE TO RELATED APPLICATIONS

This application is a continuation of International Application No. PCT/CN2021/087196, filed on Apr. 14, 2021, which claims priority to Chinese Patent Application No. 202010296709.6 filed on Apr. 15, 2020, Chinese Patent Application No. 202010345796.X filed on Apr. 27, 2020, and Chinese Patent Application No. 202010414589.5 filed on May 15, 2020. The entire contents of each of the above-referenced applications are expressly incorporated herein by reference.

TECHNICAL FIELD

The present disclosure relates to field of communications technologies, and in particular, to a method for determining a conflicting resource, a terminal, and a network device.

BACKGROUND

In some communication systems (for example, the 5G communication system), a terminal is supported in simultaneously accessing a plurality of serving cells, and time resources configured for the terminal in different serving cells may be the same or different. In this way, when the terminal performs transmission in the plurality of serving cells, a transmission conflict may occur. Therefore, how to determine whether there is a conflicting time resource in a plurality of serving cells of the terminal is a technical problem that needs to be urgently resolved currently.

SUMMARY

Embodiments of the present disclosure provide a method for determining a conflicting resource, a terminal, and a network device.

According to a first aspect, an embodiment of the present disclosure provides a method for determining a conflicting resource, applied to a terminal and including:

determining, based on activation information of a secondary cell, whether there is a conflicting time resource in a plurality of serving cells of the terminal, where the plurality of serving cells include the secondary cell, and the conflicting time resource refers to: a time resource is configured as uplink and downlink respectively in different serving cells, where the activation information includes at least one of the following:

a state of the secondary cell and a command receiving time, where the state of the secondary cell includes:

an active state or a deactivated state; and the command receiving time is a receiving time of an activation command or a deactivation command of the secondary cell.

According to a second aspect, an embodiment of the present disclosure provides a method for determining a conflicting resource, applied to a network device and including:

determining, based on activation information of a secondary cell of a terminal, whether there is a conflicting time resource in a plurality of serving cells of the terminal, where the plurality of serving cells include the secondary cell, and the conflicting time resource refers to: a time resource is configured as uplink and downlink respectively in different serving cells, where the activation information includes at least one of the following:

a state of the secondary cell and a command receiving time, where the state of the secondary cell includes: an active state or a deactivated state; and the command receiving time is a receiving time for the terminal to receive an activation command or a deactivation command of the secondary cell.

According to a third aspect, an embodiment of the present disclosure provides a terminal, including:

a first determining module, configured to determine, based on activation information of a secondary cell, whether there is a conflicting time resource in a plurality of serving cells of the terminal, where the plurality of serving cells include the secondary cell, and the conflicting time resource refers to: a time resource is configured as uplink and downlink respectively in different serving cells, where the activation information includes at least one of the following:

a state of the secondary cell and a command receiving time, where the state of the secondary cell includes:

an active state or a deactivated state; and the command receiving time is a receiving time of an activation command or a deactivation command of the secondary cell.

According to a fourth aspect, an embodiment of the present disclosure provides a network device, including:

a second determining module, configured to determine, based on activation information of a secondary cell of a terminal, whether there is a conflicting time resource in a plurality of serving cells of the terminal, where the plurality of serving cells include the secondary cell, and the conflicting time resource refers to: a time resource is configured as uplink and downlink respectively in different serving cells, where the activation information includes at least one of the following:

a state of the secondary cell and a command receiving time, where the state of the secondary cell includes: an active state or a deactivated state; and the command receiving time is a receiving time for the terminal to receive an activation command or a deactivation command of the secondary cell.

According to a fifth aspect, an embodiment of the present disclosure provides a terminal, including: a memory, a processor, and a program stored in the memory and executable on the processor, where when the program is executed by the processor, steps of the method for determining a conflicting resource provided in the first aspect of the embodiments of the present disclosure are implemented.

According to a sixth aspect, an embodiment of the present disclosure provides a network device, including a memory, a processor, and a program stored in the memory and executable on the processor, where when the program is executed by the processor, steps of the method for determining a conflicting resource provided in the second aspect of the embodiments of the present disclosure are implemented.

According to a seventh aspect, an embodiment of the present disclosure provides a computer-readable storage medium, where the computer-readable storage medium stores a computer program, and when the computer program is executed by a processor, steps of the method for determining a conflicting resource provided in the first aspect of the embodiments of the present disclosure are implemented, or when the computer program is executed by a processor, steps of the method for determining a conflicting resource provided in the second aspect of the embodiments of the present disclosure are implemented.

In the embodiments of the present disclosure, it is determined, based on activation information of a secondary cell, whether there is a conflicting time resource in a plurality of serving cells of the terminal, where the plurality of serving cells include the secondary cell, and the conflicting time resource refers to: a time resource is configured as uplink and downlink respectively in different serving cells, where the activation information includes at least one of the following: a state of the secondary cell and a command receiving time, where the state of the secondary cell includes: an active state or a deactivated state; and the command receiving time is a receiving time of an activation command or a deactivation command of the secondary cell. In this way, it may be determined whether there is a conflicting time resource in a plurality of serving cells of the terminal.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the specification and claims means at least one of connected objects. For example, A and/or B represents the following three cases: Only A exists, only B exists, and both A and B exist.

In the embodiments of the present disclosure, the term such as "exemplary" or "for example" is used to represent an example, an instance, or a description. Any embodiment or design solution described as "exemplary" or "for example" in the embodiments of the present disclosure should not be construed as being more preferred or advantageous than other embodiments or design solutions.

Embodiments of the present disclosure will be described below with reference to the accompanying drawings. The method for determining a conflicting resource, the terminal, and the network device provided in the embodiments of the present disclosure may be applied to a wireless communications system. The wireless communications system may be a New Radio (NR) system or another system such as an evolved Long Term Evolution (eLTE) system, a Long Term Evolution (LTE) system, or a subsequent evolved communications system. Further, the method for determining a conflicting resource, the terminal, and the network device may be applied to an unlicensed band in the foregoing wireless communications system.

Figures 1, 2:
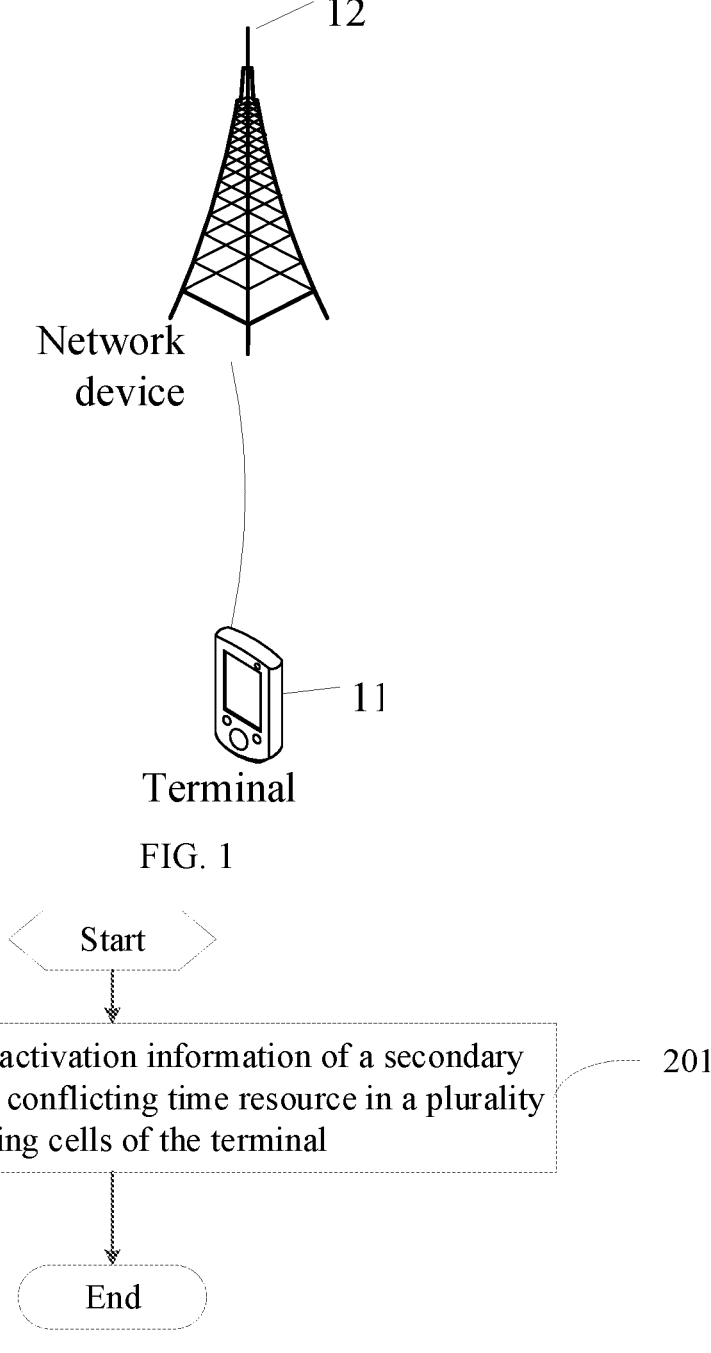
FIG. 1 is a structural diagram of a network system to which the embodiments of the present disclosure can be applied.
FIG. 2 is a flowchart of a method for determining a conflicting resource according to an embodiment of the present disclosure.

Referring to FIG. 1, FIG. 1 is a structural diagram of a network system to which an embodiment of the present disclosure can be applied. As shown in FIG. 1, the network system includes a terminal 11 and a network device 12, where the terminal 11 may be User Equipment (UE) or other terminal side devices such as a mobile phone, a tablet personal computer, a laptop computer, a Personal Digital Assistant (PDA), a Mobile Internet Device (MID), a wearable device, or a robot. It should be noted that a specific type of the terminal 11 is not limited in the embodiments of the present disclosure. The network device 12 may be a 4G base station, a 5G base station, a base station of a later version, or a base station in another communications system, or may be referred to as a NodeB, an evolved NodeB, a Transmission Reception Point (TRP), an Access Point (AP), or another word in the field. The network device is not limited to a specific technical term provided that a same technical effect is achieved. In addition, the network device 12 may be a Master Node (MN), or a Secondary Node (SN). It should be noted that in the embodiments of the present disclosure, only the 5G base station is used as an example, but a specific type of the network device is not limited.

Referring to FIG. 2, FIG. 2 is a flowchart of a method for determining a conflicting resource according to an embodiment of the present disclosure. The method is applied to a terminal. As shown in FIG. 2, the method includes the following steps.

Step 201. Determine, based on activation information of a Secondary cell (Scell), whether there is a conflicting time resource in a plurality of serving cells of the terminal, where the plurality of serving cells include the secondary cell, and the conflicting time resource refers to: a time resource is configured as uplink and downlink respectively in different serving cells, where the activation information includes at least one of the following:

a state of the secondary cell and a command receiving time, where the state of the secondary cell includes: an active state or a deactivated state; and the command receiving time is a receiving time of an activation command or a deactivation command of the secondary cell.

There may be one or more secondary cells described above. In addition, the plurality of serving cells may be serving cells of a plurality of network devices, or may be a plurality of serving cells of a same network device.

That the uplink and the downlink of different serving cells are configured with different time resources may be, on the same time resource, a serving cell may be configured with a downlink time resource, and another serving cell may be configured with an uplink time resource, or on the same time resource, a serving cell may be configured with downlink receiving, and another serving cell may be configured with uplink sending. As a result, a half duplex terminal cannot perform transmission simultaneously with the plurality of serving cells on the time resource, and thus a conflict occurs.

The determining, based on activation information of a secondary cell, whether there is a conflicting time resource in a plurality of serving cells of the terminal may be, determining a state of each secondary cell based on the activation information of the secondary cell, and then determining, based on the state of each secondary cell, whether there is a conflicting time resource in the plurality of serving cells of the terminal, or determining, based on a state of each secondary cell and a primary cell, whether there is a conflicting time resource in the plurality of serving cells of the terminal, For example, it can be determined whether downlink transmission configuration of a secondary cell conflicts with uplink and downlink transmission configuration of other cells, and it can be determined whether uplink and downlink transmission configuration of a secondary cell conflicts with uplink/downlink/flexible resource configuration of other cells. For example, a time resource A of an activated secondary cell is the downlink time resource, and the time resource A of another activated secondary cell is the uplink time resource. Therefore, the time resource A is determined to be the conflicting time resource.

In addition, the determining whether there is a conflicting time resource in the plurality of serving cells of the terminal may be, determining there is a conflicting time resource, and determining which time resource the conflicting time resource is.

In this embodiment of the present disclosure, the time resource may include at least one of the following: a symbol, a slot, and a subframe, such as an Orthogonal Frequency Division Multiplex (OFDM) symbol. This is not limited. For example, the time resource may be a time resource newly defined in a subsequent protocol, such as a time resource smaller than a symbol.

It should be noted that the conflicting time resource may be one or more time resources. The foregoing terminal may be a half duplex terminal.

In some embodiments, the terminal may meet at least one of the following conditions:

the network configures the terminal with a plurality of serving cells and an enabled half duplex behavior;

the terminal does not have a capability to perform sending and receiving simultaneously on a plurality of serving cells;

a capability of the terminal to report supporting a half duplex terminal behavior; and the terminal is not configured to monitor a Downlink Control Information format (DCI format) 2-0.

In this embodiment of the present disclosure, it can be determined whether there is a conflicting time resource in the plurality of serving cells of the terminal, so that the terminal may select to perform transmission in the conflicting time resource, so as to avoid the conflict, improve the transmission performance of the terminal. In addition, it can be determined whether the transmission can be performed on the plurality of serving cells, so as to make full use of resources on each serving cell. In addition, the determining, based on activation information of a secondary cell, whether there is a conflicting time resource in a plurality of serving cells of the terminal can have a same understanding of sending and receiving between the network device and the terminal as for the conflicting time resource, thus improving the uplink and downlink resource utilization, and avoiding excessive discarding of uplink and downlink transmission.

As an implementation, the different time resources configured for uplink and downlink of different serving cells include: at least one of a first time resource, a second time resource, a third time resource, and a fourth time resource, where the first time resource is configured as an uplink time resource in a serving cell, and the first time resource is configured as a downlink time resource in another serving cell;

the second time resource is configured as uplink sending in a serving cell, and the second time resource is configured as downlink receiving in another serving cell;

the third time resource is configured as uplink sending in a serving cell, and the third time resource is configured as a downlink time resource in another serving cell; and the fourth time resource is configured as an uplink time resource in a serving cell, and the fourth time resource is configured as downlink receiving in another serving cell.

The first time resource may be understood as being configured as the uplink time resource in some serving cells, and configured as the downlink time resource in other serving cells; the second time resource may be understood as being configured as the uplink sending in some serving cells, and configured as downlink receiving in other serving cells; the third time resource may be understood as being configured as the uplink sending in some serving cells, and configured as the downlink resource in other serving cells; and the fourth time resource may be understood as being configured as the uplink resource in some serving cells, and configured as the downlink receiving in other serving cells.

In this implementation, resources with uplink and downlink time conflicting can be determined, and resources with uplink and downlink transmission conflicting can also be determined. That is, the conflict is that uplink and downlink symbols or uplink and downlink transmissions configured for different serving cells on the same time resource are opposite, or the uplink and downlink transmissions do not match the uplink and downlink symbols.

As an implementation, the determining, based on activation information of a secondary cell, whether there is a conflicting time resource in a plurality of serving cells of the terminal includes:

determining, based on configuration information of an activated cell in the plurality of serving cells, whether there is a conflicting time resource in the plurality of serving cells of the terminal, where the activated cell includes:

an activated secondary cell; or a primary cell and an activated secondary cell.

The activated secondary cell is determined based on the activation information of the secondary cell.

In this implementation, it is determined, only based on the configuration information of the activated cell, whether there is a conflicting time resource in the plurality of serving cells of the terminal, and configuration information of a deactivated secondary cell is not used to determine whether there is a time resource conflict in uplink and downlink of a plurality of serving cells. It can be avoided that the network device and the terminal do not have a same understanding of the conflicting time resource, thereby improving resource utilization and transmission performance.

In some embodiments, the configuration information includes at least one of the following:

uplink-sending configuration information of an activated uplink Bandwidth Part (BWP);

downlink-receiving configuration information of an activated downlink BWP;

uplink-sending configuration information of a serving cell;

downlink-receiving configuration information of a serving cell;

configuration information of an uplink resource;

configuration information of a downlink resource; and configuration information of a flexible resource.

It should be noted that content of configuration information of different activated cells may be the same or different, where the content herein refers to at least one of the foregoing items. For example, the configuration information of some activated cells includes configuration information of a flexible resource, while configuration information of other activated cells does not include the configuration information of the flexible resource. In addition, the uplink-sending configuration information of the serving cell and the downlink-receiving configuration information of the serving cell can be understood as the uplink-sending configuration information and the downlink-receiving configuration information of the activated cell, because the activated cell is the serving cell. In addition, the configuration information may be RRC configuration information, and may also be other configuration information, which is not limited.

In addition, the activated uplink BWP may be a dormant uplink BWP or a non-dormant uplink BWP, and the activated downlink BWP may be a dormant downlink BWP or a non-dormant downlink BWP.

Further, the configuration information for the dormant downlink BWP may be at least one of the following configuration information:

a Channel State Information Reference Signal (CSI-RS) and a Synchronization Signal Block (SSB).

The CSI-RS may include at least one of the following: a CSI-RS used for Beam Failure Detection (BFD) and a CSI-RS used for CSI measurement.

The uplink resource, the downlink resource, and flexible resource may be an uplink symbol, a downlink symbol, and a flexible symbol, or may be an uplink slot, a downlink slot, and a flexible slot, or may be an uplink subframe, a downlink subframe, and a flexible subframe.

In addition, the uplink-sending configuration information may include at least one of the following configuration information:

a Physical Random Access Channel (PRACH), a Sounding Reference Signal (SRS), a Physical Uplink Shared Channel (PUSCH), and a Physical Uplink Control Channel (PUCCH); and the downlink-receiving configuration information may include at least one of the following configuration information:

a Physical Downlink Shared Channel (PDSCH), a CSI-RS, and a Physical Downlink Control Channel (PDCCH).

In some embodiments, in a case that the terminal receives the activation command, the activated secondary cell may include a secondary cell activated by the activation command; or in a case that the terminal receives the deactivation command, the activated secondary cell may not include a secondary cell deactivated by the deactivation command.

For example, if a secondary cell is an activated serving cell, an RRC configuration of at least one of the downlink receiving configured for the activated downlink BWP of the activated Scell, the uplink sending configured for the activated uplink BWP, the downlink receiving configured for the Scell, the uplink sending configured for the Scell, the uplink time resource, the downlink time resource, and the flexible time resource configured for the Scell may be used to determine whether there is a conflict between the secondary cell and other serving cells.

For another example, if a secondary cell is a deactivated serving cell, it is not determined whether there is a conflict in the resources of the serving cell.

Or if a secondary cell is a deactivated serving cell, the UE considers that all symbols on the deactivated serving cell are flexible symbols. For example, for the deactivated secondary cell in the plurality of serving cells, all time resources of the deactivated secondary cell are flexible time resources. The time resource herein can be symbols, slots, or subframes.

Since in each time resource, only cells configured by the high-layer signaling with uplink sending or downlink receiving, or configured by the high-layer signaling with the downlink or uplink time resource are used to determine whether there is a conflict in the plurality of serving cells, that is, the flexible time resource configured by the high-layer signaling is not considered. If a symbol of a serving cell is configured as a flexible symbol by the high-layer signaling, the cell is not considered in determining the reference serving cell. The determining the reference serving cell includes determining a cell with the lowest cell index value in the plurality of serving cells, that is, the cell whose symbol is configured as the flexible symbol by the high-layer signaling is not considered in determining the cell with the lowest cell index value. The UE configures the high-layer signaling on the time resource with uplink sending or downlink receiving, or configures the high-layer signaling to determine the reference serving cell in the cell of the downlink or uplink time resource. Further, if a symbol of a serving cell is configured as a flexible symbol by the high-layer signaling, the serving cell does not determine, on the symbol, whether there is a conflicting time resource between the serving cell and the reference serving cell or other serving cells.

In this way, as for the deactivated secondary cell, if the UE assumes that the time resource on the serving cell is a flexible time resource, according to the foregoing rules, the secondary cell may not be considered in determining the reference serving cell. Further, the secondary cell does not determine whether there is a conflicting time resource between the secondary cell and the reference serving cell or other serving cells.

In some embodiments, in a case that the terminal receives the activation command:

in a first time, the activated secondary cell includes a secondary cell activated by the activation command; and/or in a second time, the activated secondary cell does not include a secondary cell activated by the activation command, where a difference between the first time and a receiving time of the activation command is greater than or equal to a T1 time, a difference between the second time and the receiving time of the activation command is less than or equal to the T1 time, and the T1 time is a delay for activating the secondary cell.

In this implementation, the activated cell that is used to determine the conflicting time resource can be accurately determined based on the T1 time, which can more effectively ensure that the network device and the terminal have a same understanding for the conflicting time resource. For example, the terminal receives the MAC-CE indicating the activation of the secondary cell, and after the T1 time, the terminal uses an RRC configuration of at least one of the downlink receiving configured for the activated downlink BWP of the activated Scell, the uplink sending configured for the activated uplink BWP, the downlink receiving configured for the Scell, the uplink sending configured for the Scell, the uplink time resource, the downlink time resource, and the flexible time resource configured for the Scell to determine whether there is a conflict between the secondary cell and other serving cells. When it is determined whether there is a conflicting time resource in a plurality of serving cells before the T1 time, the secondary cell is considered to be a deactivated cell.

In some embodiments, a time resource of the secondary cell activated by the activation command at the second time is a flexible time resource.

For example, if the terminal considers that the time resource of the deactivated secondary cell is a flexible time resource, the terminal considers that the time resource of the secondary cell is a flexible time resource before the T1 time.

Since in each time resource, only cells configured by the high-layer signaling with uplink sending or downlink receiving, or configured by the high-layer signaling with the downlink or uplink time resource are used to determine whether there is a conflict in the plurality of serving cells, that is, the flexible time resource configured by the high-layer signaling is not considered. If a symbol of a serving cell is configured as a flexible symbol by the high-layer signaling, the cell is not considered in determining the reference serving cell. The determining the reference serving cell includes determining a cell with the lowest cell index value in the plurality of serving cells, that is, the cell whose symbol is configured as the flexible symbol by the high-layer signaling is not considered in determining the cell with the lowest cell index value. The UE configures the high-layer signaling on the time resource with uplink sending or downlink receiving, or configures the high-layer signaling to determine the reference serving cell in the cell of the downlink or uplink time resource. Further, if a symbol of a serving cell is configured as a flexible symbol by the high-layer signaling, the serving cell does not determine, on the symbol, whether there is a conflicting time resource between the serving cell and the reference serving cell or other serving cells.

In this way, as for the deactivated secondary cell, if the UE assumes that the time resource on the serving cell is a flexible time resource, according to the foregoing rules, the secondary cell may not be considered in determining the reference serving cell before the T1 time. Further, the secondary cell does not determine whether there is a conflicting time resource between the secondary cell and the reference serving cell or other serving cells.

In some embodiments, in a case that the terminal receives the deactivation command:

in a third time, the activated secondary cell includes a secondary cell deactivated by the deactivation command; and/or in a fourth time, the activated secondary cell does not include a secondary cell deactivated by the deactivation command, where a difference between the third time and a receiving time of the deactivation command is less than or equal to a T2 time, a difference between the fourth time and the receiving time of the deactivation command is greater than or equal to the T2 time, and the T2 time is a delay for deactivating the secondary cell.

In this implementation, the deactivated cell that is not used to determine the conflicting time resource can be accurately determined based on the T2 time, which can more effectively ensure that the network device and the terminal have a same understanding for the conflicting time resource. For example, the terminal receives the MAC-CE indicating the deactivation of the secondary cell, and after the T2 time, the terminal stops using an RRC configuration of at least one of the downlink receiving configured for the activated downlink BWP of the activated secondary cell, the uplink sending configured for the activated uplink BWP, the downlink receiving configured for the Scell, the uplink sending configured for the Scell, the uplink time resource, the downlink time resource, and the flexible time resource configured for the Scell to determine whether there is a conflict between the secondary cell and other serving cells. When it is determined whether there is a conflicting time resource in a plurality of serving cells before the T2 time, the secondary cell is considered to be an activated cell.

In some embodiments, a time resource of the secondary cell deactivated by the deactivation command at the fourth time is a flexible time resource.

For example, if the terminal considers that the time resource of the deactivated secondary cell is a flexible time resource, the terminal considers that the time resource of the secondary cell is a flexible time resource after the T2 time.

Since in each time resource, only cells configured by the high-layer signaling with uplink sending or downlink receiving, or configured by the high-layer signaling with the downlink or uplink time resource are used to determine whether there is a conflict in the plurality of serving cells, that is, the flexible time resource configured by the high-layer signaling is not considered. If a symbol of a serving cell is configured as a flexible symbol by the high-layer signaling, the cell is not considered in determining the reference serving cell. The determining the reference serving cell includes determining a cell with the lowest cell index value in the plurality of serving cells, that is, the cell whose symbol is configured as the flexible symbol by the high-layer signaling is not considered in determining the cell with the lowest cell index value. The UE configures the high-layer signaling on the time resource with uplink sending or downlink receiving, or configures the high-layer signaling to determine the reference serving cell in the cell of the downlink or uplink time resource. Further, if a symbol of a serving cell is configured as a flexible symbol by the high-layer signaling, the serving cell does not determine, on the symbol, whether there is a conflicting time resource between the serving cell and the reference serving cell or other serving cells.

In this way, as for the deactivated secondary cell, if the UE assumes that the time resource on the serving cell is a flexible time resource, according to the foregoing rules, configuration on the secondary cell may not be considered in determining the reference serving cell after the T2 time. Further, the secondary cell does not determine whether there is a conflicting time resource between the secondary cell and the reference serving cell or other cells.

As an implementation, configuration information of a deactivated secondary cell in the plurality of serving cells is not used to determine whether there is a conflicting time resource in the plurality of serving cells.

In this implementation, it is determined, only based on the configuration information of the activated cell, whether there is a conflicting time resource in the plurality of serving cells of the terminal, and configuration information of a deactivated secondary cell is not used to determine whether there is a time resource conflict in uplink and downlink of a plurality of serving cells. It can be avoided that the network device and the terminal do not have a same understanding of the conflicting time resource, thereby improving resource utilization and transmission performance.

As an implementation, the method further includes:
determining, based on activation information of a secondary cell, a reference serving cell (reference cell) in the plurality of serving cells.

In this implementation, it is determined, based on activation information of a secondary cell, a reference serving cell in the plurality of serving cells. In this way, it can be ensured that the network device and the terminal have a same understanding of the reference serving cell.

In some embodiments, the reference serving cell is: an activated cell with the lowest cell index value in the plurality of serving cells, where
the activated cell includes:
an activated secondary cell; or
a primary cell and an activated secondary cell.

It should be noted that, for the activated secondary cell herein, reference may be made to the determination of the activated cell for determining the conflicting time resource. Details are not described herein again.

In some embodiments, the plurality of serving cells are in one frequency band or in one frequency band combination.

In this implementation, the conflicting time resource among a plurality of serving cells in a same frequency band may be determined, and the reference serving cell may be determined. Moreover, the conflicting time resource among a plurality of serving cells in a same frequency band combination may be determined, and the reference serving cell may be determined.

As an implementation, the terminal may perform the following actions for the foregoing conflicting time resource:
if at least one of these time resources is a downlink time resource indicated by the high-layer signaling on the reference serving cell, or is indicated by the high-layer signaling for receiving the PDCCH, the PDSCH, or the CSI-RS on the reference serving cell, the PUCCH, the PUSCH, or the PRACH is not sent on a time resource of other serving cells; and
if a time resource in time resources of other serving cells is a downlink time resource indicated by the high-layer signaling on the reference serving cell, or is indicated by the high-layer signaling for receiving the PDCCH, the PDSCH, or the CSI-RS on the reference serving cell, the SRS is not sent on a time resource of other serving cells.
If at least one time resource in time resources of other serving cells is an uplink time resource indicated by the high-layer signaling on the reference serving cell, or is indicated by the high-layer signaling for sending the SRS, the PUCCH, the PUSCH, or the PRACH on the reference serving cell, the PDCCH, the PDSCH, or the CSI-RS indicated by the high-layer signaling is not received on a time resource of other serving cells;
the time resource indicated by the high-layer signaling as downlink on other serving cells, and indicated by the high-layer signaling to transmit the SRS, the PUCCH, the PUSCH, or the PRACH on the reference serving cell is the flexible time resource; and
the time resource indicated by the high-layer signaling as uplink on other serving cells, and indicated by the high-layer signaling to receive the PDCCH, the PDSCH, or the CSI on the reference serving cell is the flexible time resource.

As an implementation, all time resources of a Dormant Scell in the plurality of serving cells are flexible time resources, where the dormant secondary cell is in an active state, and an activated BWP is a secondary cell of a dormant BWP.

The time resource herein can be symbols, slots, or subframes.

Since in each time resource, only cells configured by the high-layer signaling with uplink sending or downlink receiving, or configured by the high-layer signaling with the downlink or uplink time resource are used to determine whether there is a conflict in the plurality of serving cells, that is, the flexible time resource configured by the high-layer signaling is not considered. If a symbol of a serving cell is configured as a flexible symbol by the high-layer signaling, the cell is not considered in determining the reference serving cell. The determining the reference serving cell includes determining a cell with the lowest cell index value in the plurality of serving cells, that is, the cell whose symbol is configured as the flexible symbol by the high-layer signaling is not considered in determining the cell with the lowest cell index value. The UE configures the high-layer signaling on the time resource with uplink sending or downlink receiving, or configures the high-layer signaling to determine the reference serving cell in the cell of the downlink or uplink time resource. Further, if a symbol of a serving cell is configured as a flexible symbol by the high-layer signaling, and there is no high-layer signaling to configure uplink sending or downlink receiving on this symbol, the serving cell does not determine, on the symbol, whether there is a conflicting time resource between the serving cell and the reference serving cell or other serving cells.

In this way, as for the dormant cell, the UE assumes that the time resource on the serving cell is a flexible time resource.

In some embodiments, all the time resources include:
a downlink time resource and an uplink time resource configured on a network side.

The downlink time resource and the uplink time resource configured on the network side may be the downlink time resource and the uplink time resource configured by the high-layer signaling. For example, even if the symbol of the dormant serving cell is configured by the high-layer signaling as the downlink time resource or the uplink time resource, the UE ignores these configurations, and assumes that these time resources are flexible time resources.

According to the foregoing rules, the secondary cell may not be considered in determining the reference serving cell. Further, the secondary cell does not determine whether there is a conflicting time resource between the secondary cell and the reference serving cell or other serving cells.

As an implementation, in a case of determining a reference serving cell in the plurality of serving cells, configuration information of a dormant secondary cell in the plurality of serving cells is not used; or a reference serving cell in the plurality of serving cells is determined based on configuration information of an activated cell in the plurality of serving cells, the activated cell includes: an activated secondary cell, or a primary cell and an activated secondary cell, and the activated secondary cell is a non-dormant secondary cell, where the dormant secondary cell is in an active state, and an activated BWP is a secondary cell of a dormant BWP.

The configuration information of the foregoing activated cell may be all or a part of the configuration information of the activated cell.

In this implementation, the reference serving cell may be determined not based on the configuration information of the dormant secondary cell.

As an implementation, configuration information of a dormant secondary cell in the plurality of serving cells is not used to determine whether there is a conflicting time resource in the plurality of serving cells; or it is determined, based on configuration information of an activated cell in the plurality of serving cells, whether there is a conflicting time resource in the plurality of serving cells of the terminal, where the activated cell includes: an activated secondary cell, or a primary cell and an activated secondary cell, and the activated secondary cell is a non-dormant secondary cell, where the configuration information of the foregoing activated cell may be all or a part of the configuration information of the activated cell.

The dormant secondary cell is in an active state, and an activated BWP is a secondary cell of a dormant BWP.

In this embodiment, it may be determined, not based on the configuration information of the dormant secondary cell, whether there is a conflicting time resource in the plurality of serving cells of the terminal.

In some embodiments, the configuration information of the dormant secondary cell includes at least one of the following:

configuration information of an uplink resource;
configuration information of a downlink resource;
configuration of PDCCH monitoring;
transmission configuration of a Semi-Persistent Scheduling (SPS) PDSCH;
transmission configuration of a configured grant PUSCH;
transmission configuration of a PRACH;
transmission configuration of a CSI-RS;
transmission configuration of an SRS; and
transmission configuration of a PUCCH.

In some embodiments, the CSI-RS is not used for at least one of the following:

Radio Resource Management (RRM) measurement, BFD, and Channel State Information (CSI) measurement.

In this implementation, the CSI-RS may be a CSI-RS used for other purposes other than RRM measurement, BFD, and CSI measurement, so that the transmission configuration of the CSI-RS used for the RRM measurement, BFD, and CSI measurement can be used for determining the serving reference cell and determining whether there is a conflicting time resource in the plurality of serving cells of the terminal.

In some embodiments, the SRS is an SRS with a cycle less than or equal to a cycle threshold, and the cycle threshold is preset or indicated by a network.

The foregoing preset may be pre-agreed in the protocol or pre-set by the terminal. In addition, the transmission configuration of the SRS whose cycle is greater than a cycle threshold may be used to determine the serving reference cell and to determine whether there is a conflicting time resource in the plurality of serving cells of the terminal.

Figures 3, 4, 5:
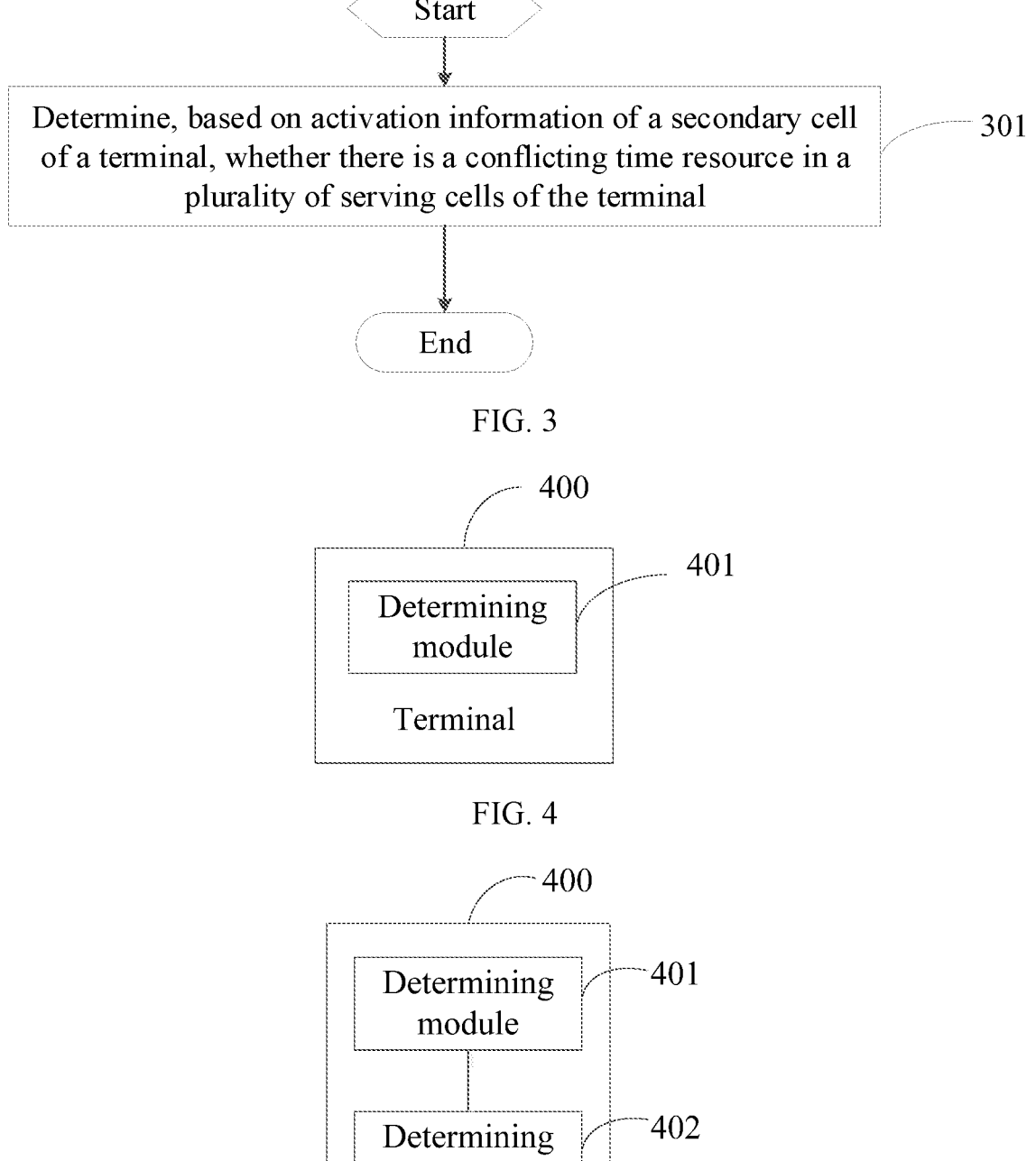
FIG. 3 is a flowchart of another method for determining a conflicting resource according to an embodiment of the present disclosure.
FIG. 4 is a structural diagram of a terminal according to an embodiment of the present disclosure.
FIG. 5 is a structural diagram of another terminal according to an embodiment of the present disclosure.

Referring to FIG. 3, FIG. 3 is a flowchart of another method for determining a conflicting resource according to an embodiment of the present disclosure. The method is applied to a network device. As shown in FIG. 3, the method includes the following steps.

Step 301. Determine, based on activation information of a secondary cell of a terminal, whether there is a conflicting time resource in a plurality of serving cells of the terminal, where the plurality of serving cells include the secondary cell, and the conflicting time resource refers to: a time resource is configured as uplink and downlink respectively in different serving cells, where the activation information includes at least one of the following:

a state of the secondary cell and a command receiving time, where the state of the secondary cell includes:

an active state or a deactivated state; and the command receiving time is a receiving time for the terminal to receive an activation command or a deactivation command of the secondary cell.

In some embodiments, the different time resources configured for uplink and downlink of different serving cells include: at least one of a first time resource, a second time resource, a third time resource, and a fourth time resource, where the first time resource is configured as an uplink time resource in a serving cell, and the first time resource is configured as a downlink time resource in another serving cell;

the second time resource is configured as uplink sending in a serving cell, and the second time resource is configured as downlink receiving in another serving cell;

the third time resource is configured as uplink sending in a serving cell, and the third time resource is configured as a downlink time resource in another serving cell; and the fourth time resource is configured as an uplink time resource in a serving cell, and the fourth time resource is configured as downlink receiving in another serving cell.

In some embodiments, the time resource includes at least one of the following: a symbol, a slot, and a subframe.

In some embodiments, the determining, based on activation information of a secondary cell, whether there is a conflicting time resource in a plurality of serving cells of the terminal includes:

determining, based on configuration information of an activated cell in the plurality of serving cells, whether there is a conflicting time resource in the plurality of serving cells of the terminal, where the activated cell includes:

an activated secondary cell; or a primary cell and an activated secondary cell.

In some embodiments, the configuration information includes at least one of the following:

uplink-sending configuration information of an activated uplink BWP;

downlink-receiving configuration information of an activated downlink BWP;

uplink-sending configuration information of a serving cell;

downlink-receiving configuration information of a serving cell;

configuration information of an uplink resource;

configuration information of a downlink resource; and configuration information of a flexible resource.

In some embodiments, the uplink-sending configuration information includes at least one of the following configuration information:

a PRACH, an SRS, a PUSCH, and a PUCCH; and the downlink-receiving configuration information includes at least one of the following configuration information:

a PDSCH, a CSI-RS, and a PDCCH.

In some embodiments, configuration information of a deactivated secondary cell in the plurality of serving cells is not used to determine whether there is a conflicting time resource in the plurality of serving cells.

In some embodiments, for the deactivated secondary cell in the plurality of serving cells, all time resources of the deactivated secondary cell are flexible time resource symbols.

In some embodiments, the method further includes:

determining, based on activation information of a secondary cell, a reference serving cell in the plurality of serving cells.

In some embodiments, the reference serving cell is: an activated cell with the lowest cell index value in the plurality of serving cells, where the activated cell includes:

an activated secondary cell; or a primary cell and an activated secondary cell.

In some embodiments, the plurality of serving cells are in one frequency band or in one frequency band combination.

In some embodiments, in a case that the terminal receives the activation command, the activated secondary cell includes a secondary cell activated by the activation command; or in a case that the terminal receives the deactivation command, the activated secondary cell does not include a secondary cell deactivated by the deactivation command.

In some embodiments, in a case that the terminal receives the activation command:

in a first time, the activated secondary cell includes a secondary cell activated by the activation command; and/or in a second time, the activated secondary cell does not include a secondary cell activated by the activation command, where a difference between the first time and a receiving time of the activation command is greater than or equal to a T1 time, a difference between the second time and the receiving time of the activation command is less than or equal to the T1 time, and the T1 time is a delay for activating the secondary cell.

In some embodiments, a time resource of the secondary cell activated by the activation command at the second time is a flexible time resource.

In some embodiments, in a case that the terminal receives the deactivation command:

in a third time, the activated secondary cell includes a secondary cell deactivated by the deactivation command; and/or in a fourth time, the activated secondary cell does not include a secondary cell deactivated by the deactivation command, where a difference between the third time and a receiving time of the deactivation command is less than or equal to a T2 time, a difference between the fourth time and the receiving time of the deactivation command is greater than or equal to the T2 time, and the T2 time is a delay for deactivating the secondary cell.

In some embodiments, a time resource of the secondary cell deactivated by the deactivation command at the fourth time is a flexible time resource.

In some embodiments, all time resources of a dormant secondary cell in the plurality of serving cells are flexible time resources, where the dormant secondary cell is in an active state, and an activated BWP is a secondary cell of a dormant BWP.

In some embodiments, all the time resources include:

a downlink time resource and an uplink time resource configured on a network side.

In some embodiments, in a case that the terminal determines a reference serving cell in the plurality of serving cells, configuration information of a dormant secondary cell in the plurality of serving cells is not used; or the terminal determines, based on configuration information of an activated cell in the plurality of serving cells, a reference serving cell in the plurality of serving cells, the activated cell includes: an activated secondary cell, or a primary cell and an activated secondary cell, and the activated secondary cell is a non-dormant secondary cell;

and/or configuration information of a dormant secondary cell in the plurality of serving cells is not used to determine whether there is a conflicting time resource in the plurality of serving cells; or the terminal determines, based on configuration information of an activated cell in the plurality of serving cells, whether there is a conflicting time resource in the plurality of serving cells of the terminal, where the activated cell includes: an activated secondary cell, or a primary cell and an activated secondary cell, and the activated secondary cell is a non-dormant secondary cell, where the dormant secondary cell is in an active state, and an activated BWP is a secondary cell of a dormant BWP.

In some embodiments, the configuration information of the dormant secondary cell includes at least one of the following:

configuration information of an uplink resource;

configuration information of a downlink resource;

configuration of PDCCH monitoring;

transmission configuration of a SPS PDSCH;

transmission configuration of a configured grant PUSCH;

transmission configuration of a PRACH;

transmission configuration of a CSI-RS;

transmission configuration of an SRS; and transmission configuration of a PUCCH.

In some embodiments, the CSI-RS is not used for at least one of the following:

RRM measurement, BFD, and CSI measurement.

In some embodiments, the SRS is an SRS with a cycle greater than or equal to a cycle threshold, and the cycle threshold is preset or indicated by a network.

It should be noted that this embodiment is used as an implementation of the network device side corresponding to the embodiment shown in FIG. 2. For an implementation, refer to the related descriptions of the embodiment shown in FIG. 2. To avoid repeated descriptions, details are not described again in this embodiment. In this embodiment, it may also be determined whether there is a conflicting time resource in a plurality of serving cells of the terminal.

The method for determining a conflicting resource provided in this embodiment of the present disclosure is illustrated below with a plurality of embodiments:

Embodiment 1

If the network is configured with a plurality of serving cells, and there is a deactivated serving cell, the terminal only uses the uplink and downlink transmission configuration of the activated Scell, or the uplink and downlink resource configuration to determine whether there is a conflict in the uplink and downlink of the plurality of serving cells (namely, the conflicting time resource described above). The uplink and downlink transmission configuration of the deactivated Scell, or the uplink and downlink resource configuration is not used to determine whether there is a conflict in the uplink and downlink of the plurality of serving cells (namely, the conflicting time resource described above).

Embodiment 2

In this embodiment, in a frequency band all serving cells are Scells, which are as follows:

If all cells are activated Scells, a cell with the lowest serving cell Scell index in the plurality of serving cells is the reference cell.

If the inactive Scell is included, a cell with the lowest index in the activated Scells is the reference cell.

For example, in a frequency band, if there are 3 Scells, index values are n1, n2, and n3, where n1<n2<n3, if all three Scells are activated Scells, a cell with the index value n1 is the reference cell; and if the Scell n1 is a deactivated cell, n2 is a reference Scell.

Embodiment 3

After receiving the activation or deactivation command of the Scell, the terminal determines the conflict time resource based on the activation delay of the Scell, which are as follows:

If the terminal receives the MAC-CE indicating the activation of the Scell, and after the T1 time, the terminal uses an RRC configuration of at least one of the downlink receiving configured for the activated downlink BWP of the activated Scell, the uplink sending configured for the activated uplink BWP, the downlink receiving configured for the Scell, the uplink sending configured for the Scell, the uplink time resource, the downlink time resource, and the flexible time resource configured for the Scell to determine whether there is a conflict between the secondary cell and other serving cells; and before the T1 time, the Scell is considered to be a deactivated cell, and the uplink and downlink transmission configuration or uplink and downlink resource configuration on the Scell is not used to determine whether there is a conflict among a plurality of serving cells.

After the Scell activation command is received in the slot n, the T1 may be related to the HARQ feedback time $T_{HARQ}$, the Scell activation delay $T_{activation}$, and the CSI reporting time $T_{CSI\_Reporting}$. For example, the terminal needs to be able to report valid CSI and perform Scell activation no later than the slot $$n + \frac{T_{HARQ} + T_{activation} + T_{CSI\_Reporting}}{NR \text{ slot length}}.$$

That is, the T1 is $$\frac{T_{HARQ} + T_{activation} + T_{CSI\_Reporting}}{NR \text{ slot length}},$$

and NR slot length is a quantity of slots included in 1 ms. $T_{HARQ}$ is a time between downlink data transmission (DL data transmission) and HARQ feedback in ms, $T_{CSI\_Reporting}$ is a delay including the uncertainty of receiving a first CSI-RS resource, the processing delay of CSI reporting, and the delay corresponding to the uncertainty of obtaining the first CSI reporting resource. As for the delay $T_{activation}$ for activating the Scell, $T_{activation}$ varies with different scenarios and configurations. For example, it may be related to at least one of the following factors:

whether the Scell is a known Scell;

the SS block based RRM Measurement Timing Configuration (SMTC) cycle configuration;

whether the UE is configured with cyclical or semi-persistent CSI reporting;

the frequency band of the Scell; and whether the band to which the Scell belongs has an activated cell.

For example, if the activated Scell is a known Scell and belongs to the frequency range FRI, $T_{activation}$ may be equal to $T_{First\ SSB}$+5 ms in a case that the measurement cycle of the secondary cell is less than or equal to 160 ms; and in a case that the measurement cycle of the secondary cell is greater than 160 ms, $T_{activation}$ may be equal to $T_{SMTC\_MAX}$+$T_{rs}$+5 ms.

In addition, if the activated Scell is an unknown Scell and belongs to the frequency range FR1, in a case that the Scell is detected once, $T_{activation}$ may be equal to $2 \times T_{SMTC\_MAX}$+$2 \times T_{rs}$+5 ms.

In addition, if the activated secondary cell belongs to the frequency range FR2, and there is at least one activated serving cell in the frequency band of FR2, and the following conditions are met, $T_{activation}$ may be equal to $T_{First\ SSB}$+5 ms.

In a case that the Scell is detected once, $T_{activation}$ may be equal to $2 \times T_{SMTC\_MAX}$+$2 \times T_{rs}$+5 ms.

If the activated Scell belongs to FR2, and there is at least one activated serving cell on the band of FR2, and the following conditions are met, Tactivation_time is $T_{First\ SSB}$+5 ms:

configures SMTC of the Scell.

The activated SSBs on other Scells and the SSB on this Scell can guarantee spatial quasi-co-location, where the $T_{SMTC\_MAX}$ is: the maximum value of the SMTC cycle corresponding to a plurality of secondary cells;

the $T_{First\ SSB}$ is: a time from the next SSB after n+$T_{HARQ}$+3 ms; and the $T_{rs}$ is: if the SMTC configuration of the secondary cell is received in the signaling of adding the secondary cell, $T_{rs}$ is the SMTC cycle. Otherwise, $T_{rs}$ is the SMTC cycle configured by the high-layer signaling measObjectNR with the same frequency of the SSB and with the same subcarrier interval.

Embodiment 4

If the terminal receives the MAC-CE indicating the deactivation of the Scell, and after the T2 time, the terminal stops using an RRC configuration of at least one of the downlink receiving configured for the activated downlink BWP of the activated Scell, the uplink sending configured for the activated uplink BWP, the downlink receiving configured for the Scell, the uplink sending configured for the Scell, the uplink time resource, the downlink time resource, and the flexible time resource configured for the Scell to determine whether there is a conflict between the secondary cell and other serving cells; and when it is determined whether there is a conflicting time resource in a plurality of serving cells before the T2 time, the Scell is considered to be an activated cell, where:

the T2 may be n+T_HARQ+X ms, where X is greater than or equal to 0; and

THARQ is a time between DL data transmission and HARQ feedback.

Embodiment 5

Except that the Scell may be in the active and deactivated states, the activated BWP of the activated Scell may be the dormant BWP. In a case that the activated BWP is the dormant BWP, the terminal may only need to perform at least one of the following operations on the BWP: beam failure detection and CSI measurement, and other RRC configurations do not take effect. For example, the RACH configuration, the SRS configuration, the PUCCH configuration, the configured grant PUSCH configuration, the PDCCH search space set configuration, the SPS PDSCH configuration, and the like.

When the terminal determines whether there is a conflict in the uplink and downlink configurations of the plurality of serving cells, for the Scell whose activated BWP is the dormant BWP, the UE can still use the configuration information of the downlink BWP, (for example, the RRC configuration), and the following downlink configuration may be used only to determine whether there is a conflict on corresponding resources between the serving cell and other serving cells:

the CSI-RS and/or the SSB.

The CSI-RS may include at least one of the following:

a CSI-RS used for BFD and a CSI-RS used for CSI measurement.

In some embodiments, the terminal uses other downlink BWPs other than the dormant BWP or the uplink and downlink transmissions configured for the uplink BWP to determine whether there is an uplink and downlink configuration conflict between the serving cell and other serving cells. The BWP may be at least one of the following:

a first non-dormant BWP;

a first active downlink BWP; and the BWP indicated by the network side through RRC signaling.

The BWP may be a downlink BWP, and correspondingly, the uplink BWP is an uplink BWP with the same downlink BWP ID.

The first-non-dormant-BWP is configured by the network, and when the terminal receives the DCI indicating that the activated BWP of the Scell is the dormant BWP, the UE uses the BWP as the activated DL BWP.

The firstActiveDownlinkBWP is configured by the network, and when the Scell is activated, the UE uses the BWP as the activated BWP. The terminal uses the downlink configuration in first-non-dormant-BWP or firstActive-DownlinkBWP as the downlink configuration of the Scell for activating the downlink BWP as the dormant BWP, the configuration of the uplink BWP with the same BWP ID is used as the uplink configuration of the Scell for activating the uplink BWP as the dormant BWP, and the uplink and downlink configuration is used as the configuration of the serving cell to determine whether there is an uplink and downlink conflict between the serving cell and other serving cells.

In some embodiments, the network may indicate a BWP-ID through the RRC, and the UE uses the configuration of the uplink BWP or the downlink BWP corresponding to the ID as the configuration of the serving cell to determine whether there is an uplink and downlink conflict between the serving cell and other serving cells.

Embodiment 6

The network may configure a plurality of serving cells for the terminal, where the activation BWP of at least one Scell is the dormant BWP, and the terminal does not have PDSCH configuration information on the dormant BWP, or the PDSCH configuration information is obtained, but the configuration information is not used. The configuration information includes information such as PDSCH time domain resource allocation.

When the HARQ-Ack feedback configured by the network for the terminal uses the HARQ-Ack codebook of Type-1, (namely, the semi-static codebook), the terminal may determine, based on configuration of the time domain resource allocation of the PDSCH in the activated downlink BWP of the activated BWP in each serving cell, a PDSCH occasion, and determine an HARQ-Ack codebook.

Further, when the activated downlink BWP of one or more serving cells of the UE is the dormant BWP, there is no PDSCH occasion on the serving cell in the HARQ-Ack codebook because there is no PDSCH configuration, or the PDSCH configuration is not used. In this way, a bit length in the HARQ-Ack codebook fed back by the terminalis reduced, which can improve the transmission performance of the HARQ-Ack feedback, or reduce the resources occupied by the HARQ-Ack feedback bit.

In some embodiments, when the activated downlink BWP of one or more serving cells of the terminalis the dormant BWP, the UE uses the PDSCH configuration of other downlink BWPs other than the dormant BWP to determine the PDSCH occasion, and determine the HARQ-Ack codebook based on the occasion. The following PDSCH configuration of the downlink BWP of the serving cell may be used:

first-non-dormant-BWP firstActiveDownlinkBWP the BWP indicated by the network through RRC signaling The first-non-dormant-BWP is configured by the network, and when the UE receives the DCI indicating that the activated BWP of the Scell is the dormant BWP, the UE uses the BWP as the activated DL BWP.

The firstActiveDownlinkBWP is configured by the network, and when the Scell is activated, the UE uses the BWP as the activated BWP. The UE uses the PDSCH configuration in first-non-dormant-BWP or firstActiveDownlinkBWP as the PDSCH configuration of the Scell to activate the downlink BWP to the dormant BWP, and is used to determine the HARQ-Ack codebook.

In some embodiments, the network may indicate a BWP through RRC, and the UE uses the PDSCH configuration in the BWP as the PDSCH configuration of the Scell to activate the downlink BWP to the dormant BWP, and is used to determine the HARQ-Ack codebook.

The determining the HARQ-Ack codebook is to determine the length of the HARQ-Ack codebook, the order of bits in the codebook and other information.

Embodiment 7

Except that the Scell may be in the active and deactivated states, the activated BWP of the activated Scell may be the dormant BWP. In a case that the activated BWP is the dormant BWP, the terminal may only need to perform at least one of the following operations on the BWP: beam failure detection and CSI measurement. Some SRSs are sent, and other RRC configurations do not take effect. For example, the RACH configuration, the SRS configuration, the PUCCH configuration, the configured grant PUSCH configuration, the PDCCH search space set configuration, the SPS PDSCH configuration, and the like. For SRS sending, only some SRSs may be supported in being sent, for example, the SRS with a cycle greater than a preset value or a configured value may be sent.

When the terminal determines whether there is a conflict in the uplink and downlink configurations of a plurality of serving cells, for the Scell in which the BWP is activated to the dormant BWP, the UE ignores the uplink symbol or the downlink symbol configured by the RRC, and the UE assumes that all symbols of the Scell in which the BWP is activated to the dormant BWP are flexible symbols.

If there is no sending or receiving configured by the valid RRC for the symbol of the Scell, for the Scell, since it is assumed to be a flexible symbol, the serving cell is not used as the serving cell in determining the reference cell. A reference serving cell is determined in other cells determined to be downlink symbols or uplink symbols.

If the symbol of the Scell includes the uplink sending or downlink receiving configured by the valid RRC, if the valid RRC configuration includes downlink transmission, the symbol is determined as the downlink symbol; and if the valid RRC configuration includes uplink transmission, the symbol is determined as the uplink symbol. The uplink sending configured by the RRC includes at least one of the following configuration information: a PRACH, an SRS, a PUSCH, and a PUCCH; and the downlink receiving configured by the RRC includes at least one of the following configuration information: a PDSCH, a CSI-RS, and a PDCCH.

On each symbol, based on whether the symbol in the plurality of serving cells is the uplink symbol or the downlink symbol, the reference cell in the plurality of serving cells is first determined, and the reference cell is the serving cell with the lowest serving cell index (number). The plurality of serving cells include a primary cell, a primary secondary cell, or an activated secondary cell.

After the reference serving cell in the plurality of serving cells is determined, it is determined, based on the configuration or scheduling of the reference serving cell and other serving cells, a serving cell to perform sending or receiving. The following are included:

if at least one of these time resources is a downlink time resource indicated by the high-layer signaling on the reference serving cell, or is indicated by the high-layer signaling for receiving the PDCCH, the PDSCH, or the CSI-RS on the reference serving cell, the PUCCH, the PUSCH, or the PRACH is not sent on a time resource of other serving cells; and if a time resource in time resources of other serving cells is a downlink time resource indicated by the high-layer signaling on the reference serving cell, or is indicated by the high-layer signaling for receiving the PDCCH, the PDSCH, or the CSI-RS on the reference serving cell, the SRS is not sent on a time resource of other serving cells.

If at least one time resource in time resources of other serving cells is an uplink time resource indicated by the high-layer signaling on the reference serving cell, or is indicated by the high-layer signaling for sending the SRS, the PUCCH, the PUSCH, or the PRACH on the reference serving cell, the PDCCH, the PDSCH, or the CSI-RS indicated by the high-layer signaling is not received on a time resource of other serving cells;

the time resource indicated by the high-layer signaling as downlink on other serving cells, and indicated by the high-layer signaling to transmit the SRS, the PUCCH, the PUSCH, or the PRACH on the reference serving cell is the flexible time resource; and the time resource indicated by the high-layer signaling as uplink on other serving cells, and indicated by the high-layer signaling to receive the PDCCH, the PDSCH, or the CSI on the reference serving cell is the flexible time resource.

This embodiment of the present disclosure may be implemented as follows:

determining whether there is a conflict between the configured Serving cells based on the actually activated Scell, and determining a corresponding terminal behavior; and determining the reference cell in each frequency band or each frequency band combination based on the actual activated Scell.

After receiving the activation or deactivation command of a Scell, before the maximum delay of activation or deactivation, the UE assumes that the Scell is a deactivated cell or an activated cell, and determines whether there is an uplink and downlink conflict between Serving cells.

In this way, the terminal may determine whether there is a conflict among a plurality of serving cells based on the activated Scell, thus improving the uplink and downlink resource utilization, and avoiding excessive discarding of uplink and downlink transmission. In addition, in the process of activating or deactivating the Scell, the maximum delay is used as an effective time of the uplink and downlink configuration of the Scell, so as to avoid fuzzy understanding for the uplink and downlink configuration between network device and the terminal.

Referring to FIG. 4, FIG. 4 is a structural diagram of a terminal according to an embodiment of the present disclosure. As shown in FIG. 4, the terminal 400 includes:

a first determining module 401, configured to determine, based on activation information of a secondary cell, whether there is a conflicting time resource in a plurality of serving cells of the terminal, where the plurality of serving cells include the secondary cell, and the conflicting time resource refers to: a time resource is configured as uplink and downlink respectively in different serving cells, where the activation information includes at least one of the following:

a state of the secondary cell and a command receiving time, where the state of the secondary cell includes: an active state or a deactivated state.

In some embodiments, the different time resources configured for uplink and downlink of different serving cells include: at least one of a first time resource, a second time resource, a third time resource, and a fourth time resource, where the first time resource is configured as an uplink time resource in a serving cell, and the first time resource is configured as a downlink time resource in another serving cell;

the second time resource is configured as uplink sending in a serving cell, and the second time resource is configured as downlink receiving in another serving cell;

the third time resource is configured as uplink sending in a serving cell, and the third time resource is configured as a downlink time resource in another serving cell; and the fourth time resource is configured as an uplink time resource in a serving cell, and the fourth time resource is configured as downlink receiving in another serving cell.

In some embodiments, the time resource includes at least one of the following: a symbol, a slot, and a subframe.

In some embodiments, the determining, based on activation information of a secondary cell, whether there is a conflicting time resource in a plurality of serving cells of the terminal includes:

determining, based on configuration information of an activated cell in the plurality of serving cells, whether there is a conflicting time resource in the plurality of serving cells of the terminal, where the activated cell includes:

an activated secondary cell; or a primary cell and an activated secondary cell.

In some embodiments, the configuration information includes at least one of the following:

uplink-sending configuration information of an activated uplink BWP;

downlink-receiving configuration information of an activated downlink BWP;

uplink-sending configuration information of a serving cell;

downlink-receiving configuration information of a serving cell;

configuration information of an uplink resource;

configuration information of a downlink resource; and configuration information of a flexible resource.

In some embodiments, the uplink-sending configuration information includes at least one of the following configuration information:

a PRACH, an SRS, a PUSCH, and a PUCCH; and the downlink-receiving configuration information includes at least one of the following configuration information:

a PDSCH, a CSI-RS, and a PDCCH.

In some embodiments, configuration information of a deactivated secondary cell in the plurality of serving cells is not used to determine whether there is a conflicting time resource in the plurality of serving cells.

In some embodiments, for the deactivated secondary cell in the plurality of serving cells, all time resources of the deactivated secondary cell are flexible time resource symbols.

In some embodiments, as shown in FIG. 5, the terminal 400 further includes:

a determining module 402, configured to determine, based on activation information of a secondary cell, a reference serving cell in the plurality of serving cells.

In some embodiments, the reference serving cell is: an activated cell with the lowest cell index value in the plurality of serving cells, where the activated cell includes:

an activated secondary cell; or a primary cell and an activated secondary cell.

In some embodiments, the plurality of serving cells are in one frequency band or in one frequency band combination.

In some embodiments, in a case that the terminal receives the activation command, the activated secondary cell includes a secondary cell activated by the activation command; or in a case that the terminal receives the deactivation command, the activated secondary cell does not include a secondary cell deactivated by the deactivation command.

In some embodiments, in a case that the terminal receives the activation command:

in a first time, the activated secondary cell includes a secondary cell activated by the activation command; and/or in a second time, the activated secondary cell does not include a secondary cell activated by the activation command, where a difference between the first time and a receiving time of the activation command is greater than or equal to a T1 time, a difference between the second time and the receiving time of the activation command is less than or equal to the T1 time, and the T1 time is a delay for activating the secondary cell.

In some embodiments, a time resource of the secondary cell activated by the activation command at the second time is a flexible time resource.

In some embodiments, in a case that the terminal receives the deactivation command:

in a third time, the activated secondary cell includes a secondary cell deactivated by the deactivation command; and/or in a fourth time, the activated secondary cell does not include a secondary cell deactivated by the deactivation command, where a difference between the third time and a receiving time of the deactivation command is less than or equal to a T2 time, a difference between the fourth time and the receiving time of the deactivation command is greater than or equal to the T2 time, and the T2 time is a delay for deactivating the secondary cell.

In some embodiments, a time resource of the secondary cell deactivated by the deactivation command at the fourth time is a flexible time resource.

In some embodiments, all time resources of a dormant secondary cell in the plurality of serving cells are flexible time resources, where the dormant secondary cell is in an active state, and an activated BWP is a secondary cell of a dormant BWP.

In some embodiments, all the time resources include:

a downlink time resource and an uplink time resource configured on a network side.

In some embodiments, in a case of determining a reference serving cell in the plurality of serving cells, configuration information of a dormant secondary cell in the plurality of serving cells is not used; or a reference serving cell in the plurality of serving cells is determined based on configuration information of an activated cell in the plurality of serving cells, the activated cell includes: an activated secondary cell, or a primary cell and an activated secondary cell, and the activated secondary cell is a non-dormant secondary cell;

and/or configuration information of a dormant secondary cell in the plurality of serving cells is not used to determine whether there is a conflicting time resource in the plurality of serving cells; or it is determined, based on configuration information of an activated cell in the plurality of serving cells, whether there is a conflicting time resource in the plurality of serving cells of the terminal, where the activated cell includes: an activated secondary cell, or a primary cell and an activated secondary cell, and the activated secondary cell is a non-dormant secondary cell, where the dormant secondary cell is in an active state, and an activated BWP is a secondary cell of a dormant BWP.

In some embodiments, the configuration information of the dormant secondary cell includes at least one of the following:

configuration information of an uplink resource;

configuration information of a downlink resource;

configuration of PDCCH monitoring;

transmission configuration of an SPS PDSCH;

transmission configuration of a configured grant PUSCH;

transmission configuration of a PRACH;

transmission configuration of a CSI-RS;

transmission configuration of an SRS; and transmission configuration of a PUCCH.

In some embodiments, the CSI-RS is not used for at least one of the following:

RRM measurement, BFD, and CSI measurement.

In some embodiments, the SRS is an SRS with a cycle less than or equal to a cycle threshold, and the cycle threshold is preset or indicated by a network.

The terminal provided in this embodiment of the present disclosure can implement the processes implemented by the terminal in the method embodiment in FIG. 2. To avoid repetition, details are not described herein again, and it may be determined whether there is a conflicting time resource in a plurality of serving cells of the terminal.

Figure 6:
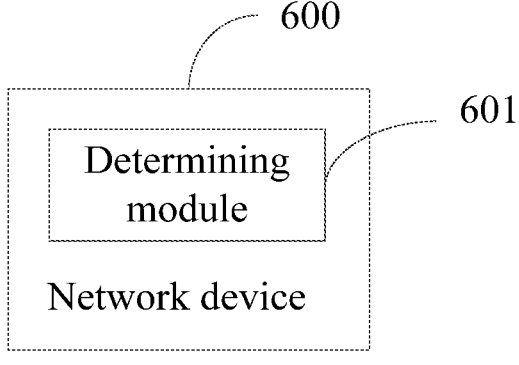
FIG. 6 is a structural diagram of a network device according to an embodiment of the present disclosure.

Referring to FIG. 6, FIG. 6 is a structural diagram of a network device according to an embodiment of the present disclosure. As shown in FIG. 6, a network device 600 includes:

a second determining module 601, configured to determine, based on activation information of a secondary cell of a terminal, whether there is a conflicting time resource in a plurality of serving cells of the terminal, where the plurality of serving cells include the secondary cell, and the conflicting time resource refers to: a time resource is configured as uplink and downlink respectively in different serving cells, where the activation information includes at least one of the following:

a state of the secondary cell and a command receiving time, where the state of the secondary cell includes: an active state or a deactivated state.

In some embodiments, the different time resources configured for uplink and downlink of different serving cells include: at least one of a first time resource, a second time resource, a third time resource, and a fourth time resource, where the first time resource is configured as an uplink time resource in a serving cell, and the first time resource is configured as a downlink time resource in another serving cell;

the second time resource is configured as uplink sending in a serving cell, and the second time resource is configured as downlink receiving in another serving cell;

the third time resource is configured as uplink sending in a serving cell, and the third time resource is configured as a downlink time resource in another serving cell; and the fourth time resource is configured as an uplink time resource in a serving cell, and the fourth time resource is configured as downlink receiving in another serving cell.

In some embodiments, the time resource includes at least one of the following: a symbol, a slot, and a subframe.

In some embodiments, the determining, based on activation information of a secondary cell, whether there is a conflicting time resource in a plurality of serving cells of the terminal includes:

determining, based on configuration information of an activated cell in the plurality of serving cells, whether there is a conflicting time resource in the plurality of serving cells of the terminal, where the activated cell includes:

an activated secondary cell; or a primary cell and an activated secondary cell.

In some embodiments, the configuration information includes at least one of the following:

uplink-sending configuration information of an activated uplink BWP;

downlink-receiving configuration information of an activated downlink BWP;

uplink-sending configuration information of a serving cell;

downlink-receiving configuration information of a serving cell;

configuration information of an uplink resource;

configuration information of a downlink resource; and configuration information of a flexible resource.

In some embodiments, the uplink-sending configuration information includes at least one of the following configuration information:

a PRACH, an SRS, a PUSCH, and a PUCCH; and the downlink-receiving configuration information includes at least one of the following configuration information:

a PDSCH, a chCSI-RS, and a PDCCH.

In some embodiments, configuration information of a deactivated secondary cell in the plurality of serving cells is not used to determine whether there is a conflicting time resource in the plurality of serving cells.

In some embodiments, for the deactivated secondary cell in the plurality of serving cells, all time resources of the deactivated secondary cell are flexible time resource symbols.

Figure 7:
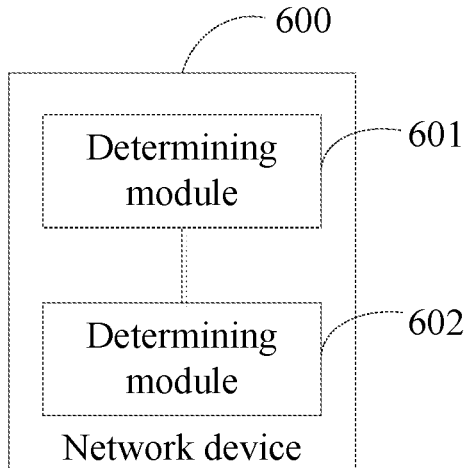
FIG. 7 is a structural diagram of another network device according to an embodiment of the present disclosure.

In some embodiments, as shown in FIG. 7, the network device 600 further includes:

a determining module 602, configured to determine, based on activation information of a secondary cell, a reference serving cell in the plurality of serving cells.

In some embodiments, the reference serving cell is: an activated cell with the lowest cell index value in the plurality of serving cells, where the activated cell includes:

an activated secondary cell; or

27 a primary cell and an activated secondary cell.

In some embodiments, the plurality of serving cells are in one frequency band or in one frequency band combination.

In some embodiments, in a case that the terminal receives the activation command, the activated secondary cell includes a secondary cell activated by the activation command; or in a case that the terminal receives the deactivation command, the activated secondary cell does not include a secondary cell deactivated by the deactivation command.

In some embodiments, in a case that the terminal receives the activation command:

in a first time, the activated secondary cell includes a secondary cell activated by the activation command; and/or in a second time, the activated secondary cell does not include a secondary cell activated by the activation command, where a difference between the first time and a receiving time of the activation command is greater than or equal to a T1 time, a difference between the second time and the receiving time of the activation command is less than or equal to the T1 time, and the T1 time is a delay for activating the secondary cell.

In some embodiments, a time resource of the secondary cell activated by the activation command at the second time is a flexible time resource.

In some embodiments, in a case that the terminal receives the deactivation command:

in a third time, the activated secondary cell includes a secondary cell deactivated by the deactivation command; and/or in a fourth time, the activated secondary cell does not include a secondary cell deactivated by the deactivation command, where a difference between the third time and a receiving time of the deactivation command is less than or equal to a T2 time, a difference between the fourth time and the receiving time of the deactivation command is greater than or equal to the T2 time, and the T2 time is a delay for deactivating the secondary cell.

In some embodiments, a time resource of the secondary cell deactivated by the deactivation command at the fourth time is a flexible time resource.

In some embodiments, all time resources of a dormant secondary cell in the plurality of serving cells are flexible time resources, where the dormant secondary cell is in an active state, and an activated BWP is a secondary cell of a dormant BWP.

In some embodiments, all the time resources include:

a downlink time resource and an uplink time resource configured on a network side.

In some embodiments, in a case that the terminal determines a reference serving cell in the plurality of serving cells, configuration information of a dormant secondary cell in the plurality of serving cells is not used; or the terminal determines, based on configuration information of an activated cell in the plurality of serving cells, a reference serving cell in the plurality of serving cells, the activated cell includes: an activated secondary cell, or a primary cell and an activated secondary cell, and the activated secondary cell is a non-dormant secondary cell;

and/or configuration information of a dormant secondary cell in the plurality of serving cells is not used to determine whether there is a conflicting time resource in the plurality of serving cells; or the terminal determines, based on configuration information of an activated cell in the plurality of serving cells, whether there is a conflicting time resource in the plurality of serving cells of the terminal, where the activated cell includes: an activated secondary cell, or a primary cell and an activated secondary cell, and the activated secondary cell is a non-dormant secondary cell, where the dormant secondary cell is in an active state, and an activated BWP is a secondary cell of a dormant BWP.

In some embodiments, the configuration information of the dormant secondary cell includes at least one of the following:

configuration information of an uplink resource;

configuration information of a downlink resource;

configuration of PDCCH monitoring;

transmission configuration of an SPS PDSCH;

transmission configuration of a configured grant PUSCH;

transmission configuration of a PRACH;

transmission configuration of a CSI-RS;

transmission configuration of an SRS; and transmission configuration of a PUCCH.

In some embodiments, the CSI-RS is not used for at least one of the following:

RRM measurement, BFD, and CSI measurement.

In some embodiments, the SRS is an SRS with a cycle greater than or equal to a cycle threshold, and the cycle threshold is preset or indicated by a network.

The network device provided in this embodiment of the present disclosure can implement the processes implemented by the network device in the method embodiment in FIG. 3. To avoid repetition, details are not described herein again, and it can be determined whether there is a conflicting time resource in a plurality of serving cells of the terminal.

Figures 8, 9:
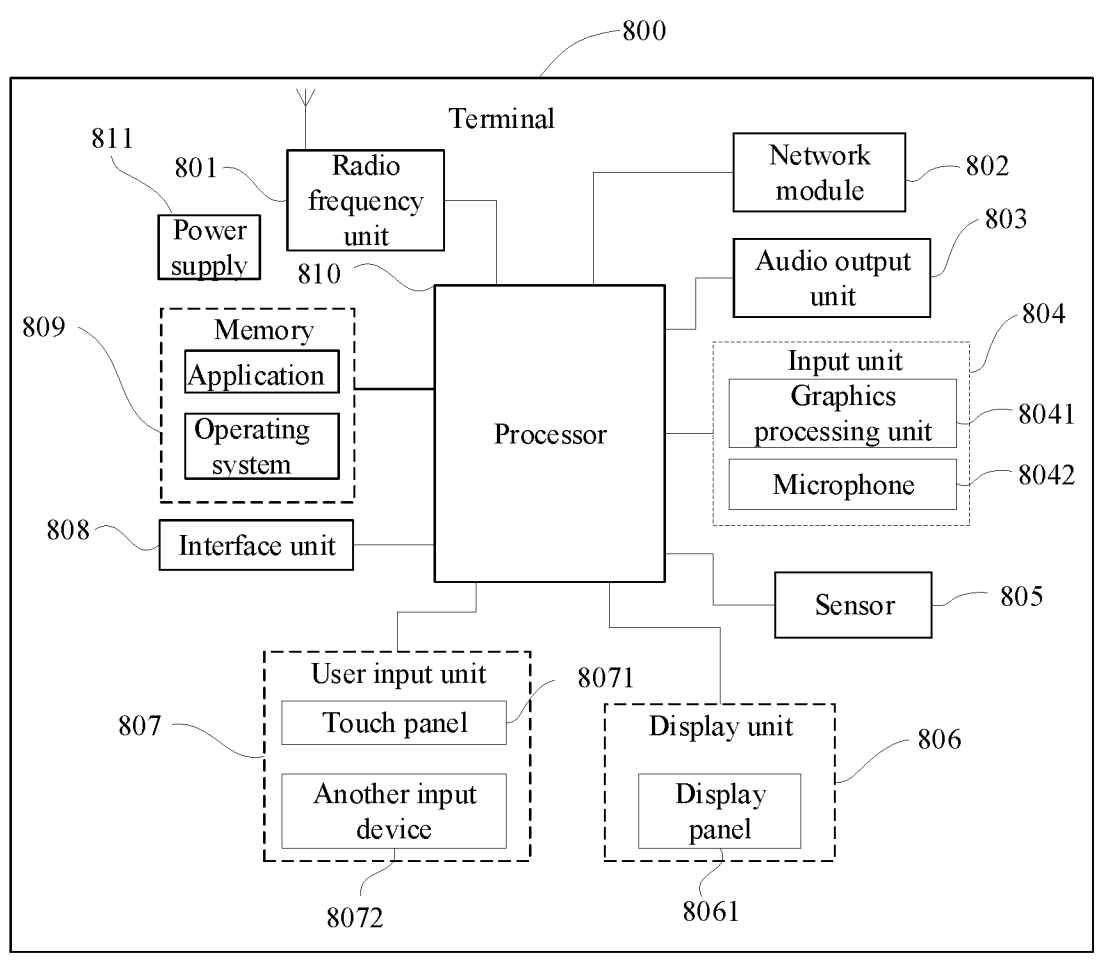
FIG. 8 is a structural diagram of another terminal according to an embodiment of the present disclosure.
FIG. 9 is a structural diagram of another network device according to an embodiment of the present disclosure.

FIG. 8 is a schematic diagram of a hardware structure of another terminal implementing the various embodiments of the present disclosure. As shown in FIG. 8, the terminal 800 includes, but is not limited to: a radio frequency unit 801, a network module 802, an audio output unit 803, an input unit 804, a sensor 805, a display unit 806, a user input unit 807, an interface unit 808, a memory 809, a processor 810, a power supply 811, and the like. A person skilled in the art can understand that a structure of the terminal shown in FIG. 8 does not constitute a limitation on the terminal, where the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a robot, a wearable device, a pedometer, and the like.

The processor 810 is configured to determine, based on activation information of a secondary cell, whether there is a conflicting time resource in a plurality of serving cells of the terminal, where the plurality of serving cells include the secondary cell, and the conflicting time resource refers to: a time resource is configured as uplink and downlink respectively in different serving cells, where the activation information includes at least one of the following:

a state of the secondary cell and a command receiving time, where the state of the secondary cell includes: an active state or a deactivated state; and the command receiving time is a receiving time of an activation command or a deactivation command of the secondary cell.

In some embodiments, the different time resources configured for uplink and downlink of different serving cells include: at least one of a first time resource, a second time resource, a third time resource, and a fourth time resource, where the first time resource is configured as an uplink time resource in a serving cell, and the first time resource is configured as a downlink time resource in another serving cell;

the second time resource is configured as uplink sending in a serving cell, and the second time resource is configured as downlink receiving in another serving cell;

the third time resource is configured as uplink sending in a serving cell, and the third time resource is configured as a downlink time resource in another serving cell; and the fourth time resource is configured as an uplink time resource in a serving cell, and the fourth time resource is configured as downlink receiving in another serving cell.

In some embodiments, the time resource includes at least one of the following: a symbol, a slot, and a subframe.

In some embodiments, the determining, based on activation information of a secondary cell, whether there is a conflicting time resource in a plurality of serving cells of the terminal includes:

determining, based on configuration information of an activated cell in the plurality of serving cells, whether there is a conflicting time resource in the plurality of serving cells of the terminal, where the activated cell includes:

an activated secondary cell; or a primary cell and an activated secondary cell.

In some embodiments, the configuration information includes at least one of the following:

uplink-sending configuration information of an activated uplink BWP;

downlink-receiving configuration information of an activated downlink BWP;

uplink-sending configuration information of a serving cell;

downlink-receiving configuration information of a serving cell;

configuration information of an uplink resource;

configuration information of a downlink resource; and configuration information of a flexible resource.

In some embodiments, the uplink-sending configuration information includes at least one of the following configuration information:

a PRACH, an SRS, a PUSCH, and a PUCCH; and the downlink-receiving configuration information includes at least one of the following configuration information:

a PDSCH, a CSI-RS, and a PDCCH.

In some embodiments, configuration information of a deactivated secondary cell in the plurality of serving cells is not used to determine whether there is a conflicting time resource in the plurality of serving cells.

In some embodiments, for the deactivated secondary cell in the plurality of serving cells, all time resources of the deactivated secondary cell are flexible time resource symbols.

In some embodiments, the processor 810 is further configured to:

determine, based on activation information of a secondary cell, a reference serving cell in the plurality of serving cells.

In some embodiments, the reference serving cell is: an activated cell with the lowest cell index value in the plurality of serving cells, where the activated cell includes:

an activated secondary cell; or a primary cell and an activated secondary cell.

In some embodiments, the plurality of serving cells are in one frequency band or in one frequency band combination.

In some embodiments, in a case that the terminal receives the activation command, the activated secondary cell includes a secondary cell activated by the activation command; or in a case that the terminal receives the deactivation command, the activated secondary cell does not include a secondary cell deactivated by the deactivation command.

In some embodiments, in a case that the terminal receives the activation command:

in a first time, the activated secondary cell includes a secondary cell activated by the activation command; and/or in a second time, the activated secondary cell does not include a secondary cell activated by the activation command, where a difference between the first time and a receiving time of the activation command is greater than or equal to a T1 time, a difference between the second time and the receiving time of the activation command is less than or equal to the T1 time, and the T1 time is a delay for activating the secondary cell.

In some embodiments, a time resource of the secondary cell activated by the activation command at the second time is a flexible time resource.

In some embodiments, in a case that the terminal receives the deactivation command:

in a third time, the activated secondary cell includes a secondary cell deactivated by the deactivation command; and/or in a fourth time, the activated secondary cell does not include a secondary cell deactivated by the deactivation command, where a difference between the third time and a receiving time of the deactivation command is less than or equal to a T2 time, a difference between the fourth time and the receiving time of the deactivation command is greater than or equal to the T2 time, and the T2 time is a delay for deactivating the secondary cell.

In some embodiments, a time resource of the secondary cell deactivated by the deactivation command at the fourth time is a flexible time resource.

In some embodiments, all time resources of a dormant secondary cell in the plurality of serving cells are flexible time resources, where the dormant secondary cell is in an active state, and an activated BWP is a secondary cell of a dormant BWP.

In some embodiments, all the time resources include:

a downlink time resource and an uplink time resource configured on a network side.

In some embodiments, in a case of determining a reference serving cell in the plurality of serving cells, configuration information of a dormant secondary cell in the plurality of serving cells is not used; or a reference serving cell in the plurality of serving cells is determined based on configuration information of an activated cell in the plurality of serving cells, the activated cell includes: an activated secondary cell, or a primary cell and an activated secondary cell, and the activated secondary cell is a non-dormant secondary cell;

and/or configuration information of a dormant secondary cell in the plurality of serving cells is not used to determine whether there is a conflicting time resource in the plurality of serving cells; or it is determined, based on configuration information of an activated cell in the plurality of serving cells, whether there is a conflicting time resource in the plurality of serving cells of the terminal, where the activated cell includes: an activated secondary cell, or a primary cell and an activated secondary cell, and the activated secondary cell is a non-dormant secondary cell, where the dormant secondary cell is in an active state, and an activated BWP is a secondary cell of a dormant BWP.

In some embodiments, the configuration information of the dormant secondary cell includes at least one of the following:

configuration information of an uplink resource;

configuration information of a downlink resource;

configuration of PDCCH monitoring;

transmission configuration of an SPS PDSCH;

transmission configuration of a configured grant PUSCH;

transmission configuration of a PRACH;

transmission configuration of a CSI-RS;

transmission configuration of an SRS; and transmission configuration of a PUCCH.

In some embodiments, the CSI-RS is not used for at least one of the following:

RRM measurement, BFD, and CSI measurement.

In some embodiments, the SRS is an SRS with a cycle less than or equal to a cycle threshold, and the cycle threshold is preset or indicated by a network.

The foregoing terminal may determine whether there is a conflicting time resource in a plurality of serving cells of the terminal.

It should be understood that, in this embodiment of the present disclosure, the radio frequency unit 801 may be configured to receive and send information or a signal in a call process. In some embodiments, after receiving downlink data from a base station, the radio frequency unit 801 sends the downlink data to the processor 810 for processing. In addition, the radio frequency unit 801 sends uplink data to the base station. Usually, the radio frequency unit 801 includes but is not limited to an antenna, at least one amplifier, a transceiver, a coupler, a low noise amplifier, a duplexer, and the like. In addition, the radio frequency unit 801 may communicate with a network and another device through a wireless communication system.

The terminal provides wireless broadband Internet access to a user through the network module 802, for example, helps the user receive and send e-mails, browse web pages, access streaming media, and the like.

The audio output unit 803 may convert audio data received by the radio frequency unit 801 or the network module 802 or stored in the memory 809 into an audio signal, and output the audio signal into sound. In addition, the audio output unit 803 can also provide audio output related to a function performed by the terminal 800 (for example, call signal receiving sound or message receiving sound). The audio output unit 803 includes a speaker, a buzzer, a receiver, and the like.

The input unit 804 is configured to receive an audio signal or a video signal. The input unit 804 may include a Graphics Processing Unit (GPU) 8041 and a microphone 8042. The graphics processing unit 8041 processes image data of a static picture or a video obtained by an image capture apparatus (such as a camera) in a video capture mode or an image capture mode. A processed image frame may be displayed on the display unit 806. The image frame processed by the graphics processing unit 8041 may be stored in the memory 809 (or another storage medium) or sent via the radio frequency unit 801 or the network module 802. The microphone 8042 may receive a sound and can process such sound into audio data. Processed audio data may be converted, in a call mode, into a format that can be sent to a mobile communication base station by using the radio frequency unit 801 for output.

The terminal 800 further includes at least one sensor 805, such as a light sensor, a motion sensor, and other sensors. In some embodiments, the light sensor includes an ambient light sensor and a proximity sensor. The ambient light sensor may adjust luminance of the display panel 8061 based on brightness of ambient light. The proximity sensor may turn off the display panel 8061 and/or backlight when the terminal 800 is moved to an ear. As a motion sensor, an accelerometer sensor can detect magnitude of acceleration in various directions (usually three axes), can detect magnitude and the direction of gravity when stationary, can be configured to identify terminal postures (such as horizontal and vertical screen switch, related games, and magnetometer posture calibration), can perform functions related to vibration identification (such as a pedometer and a knock), and the like. The sensor 805 may further include a fingerprint sensor, a pressure sensor, an iris sensor, a molecular sensor, a gyroscope, a barometer, a hygrometer, a thermometer, an infrared sensor, or the like. Details are not described herein.

The display unit 806 is configured to display information entered by a user or information provided for a user. The display unit 806 may include a display panel 8061, and the display panel 8061 may be configured in a form of a Liquid Crystal Display (LCD), an Organic Light-Emitting Diode (OLED), or the like.

The user input unit 807 may be configured to receive input numeric or character information, and generate key signal inputs related to user settings and function control of the terminal. In some embodiments, the user input unit 807 includes a touch panel 8071 and another input device 8072. The touch panel 8071, also called a touch screen, may collect a touch operation of the user on or near the touch panel 8071 (For example, the user uses any suitable object or accessory such as a finger or a stylus to operate on or near the touch panel 8071). The touch panel 8071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 810, and receives and executes a command sent by the processor 810. In addition, the touch panel 8071 may be implemented in various types such as a resistor, a capacitor, an infrared ray, or a surface acoustic wave. In addition to the touch panel 8071, the user input unit 807 may further include the another input device 8072. In some embodiments, the another input device 8072 may include but is not limited to a physical keyboard, function keys (such as a volume control key and a switch key), a trackball, a mouse, and a joystick. Details are not described herein.

Further, the touch panel 8071 may cover the display panel 8061. When detecting a touch operation on or near the touch panel 8071, the touch panel transmits the touch operation to the processor 810 to determine a type of a touch event. Then, the processor 810 provides a corresponding visual output on the display panel 8061 based on the type of the touch event. Although in FIG. 8, the touch panel 8071 and the display panel 8061 are configured as two independent components to implement input and output functions of the terminal, in some embodiments, the touch panel 8071 and the display panel 8061 may be integrated to implement the input and output functions of the terminal. Details are not limited herein.

The interface unit 808 is an interface connecting an external apparatus to the terminal 800. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 808 may be configured to receive an input (for example, data information or power) from an external apparatus and transmit the received input to one or more elements in the terminal 800, or transmit data between the terminal 800 and the external apparatus.

The memory 809 may be configured to store software programs and various data. The memory 809 may mainly include a program storage area and a data storage area. The program storage area may store an operating system, an application program required by at least one function (such as a sound playback function and an image playback function), and the like. The data storage area may store data (such as audio data and a phone book) created based on use of the mobile phone, and the like. In addition, the memory 809 may include a high-speed random access memory or a nonvolatile memory, for example, at least one disk storage device, a flash memory, or another volatile solid-state storage device.

The processor 810 is a control center of the terminal, and connects all parts of the entire terminal by using various interfaces and lines. By running or executing a software program and/or a module stored in the memory 809 and invoking data stored in the memory 809, the processor performs various functions of the terminal and data processing, to perform overall monitoring on the terminal. The processor 810 may include one or more processing units. An application processor and a modem processor may be integrated into the processor 810. The application processor mainly processes an operating system, a user interface, an application, and the like. The modem processor mainly processes wireless communications. It can be understood that the modem processor may not be integrated into the processor 810.

The terminal 800 may further include a power supply 811 (such as a battery) that supplies power to each component. The power supply 811 may be logically connected to the processor 810 by using a power management system, to implement functions such as charging, discharging, and power consumption management by using the power management system.

In addition, the terminal 800 includes some function modules not shown, and details are not described herein.

An embodiment of the present disclosure further provides a terminal, including a processor 810, a memory 809, a computer program stored in the memory 809 and executable on the processor 810. When the computer program is executed by the processor 810, processes of the method embodiment for determining a conflicting resource are implemented, and a same technical effect can be achieved. To avoid repetition, details are not described herein again.

Referring to FIG. 9, FIG. 9 is a structural diagram of another network device according to an embodiment of the present disclosure. As shown in FIG. 9, the network device 900 includes: a processor 901, a transceiver 902, a memory 903, and a bus interface:

the processor 901, configured to determine, based on activation information of a secondary cell of a terminal, whether there is a conflicting time resource in a plurality of serving cells of the terminal, where the plurality of serving cells include the secondary cell, and the conflicting time resource refers to: a time resource is configured as uplink and downlink respectively in different serving cells, where the activation information includes at least one of the following:

a state of the secondary cell and a command receiving time, where the state of the secondary cell includes: an active state or a deactivated state; and the command receiving time is a receiving time for the terminal to receive an activation command or a deactivation command of the secondary cell.

In some embodiments, the different time resources configured for uplink and downlink of different serving cells include: at least one of a first time resource, a second time resource, a third time resource, and a fourth time resource, where the first time resource is configured as an uplink time resource in a serving cell, and the first time resource is configured as a downlink time resource in another serving cell;

the second time resource is configured as uplink sending in a serving cell, and the second time resource is configured as downlink receiving in another serving cell;

the third time resource is configured as uplink sending in a serving cell, and the third time resource is configured as a downlink time resource in another serving cell; and the fourth time resource is configured as an uplink time resource in a serving cell, and the fourth time resource is configured as downlink receiving in another serving cell.

In some embodiments, the time resource includes at least one of the following: a symbol, a slot, and a subframe.

In some embodiments, the determining, based on activation information of a secondary cell, whether there is a conflicting time resource in a plurality of serving cells of the terminal includes:

determining, based on configuration information of an activated cell in the plurality of serving cells, whether there is a conflicting time resource in the plurality of serving cells of the terminal, where the activated cell includes:

an activated secondary cell; or a primary cell and an activated secondary cell.

In some embodiments, the configuration information includes at least one of the following:

uplink-sending configuration information of an activated uplink BWP;

downlink-receiving configuration information of an activated downlink BWP;

uplink-sending configuration information of a serving cell;

downlink-receiving configuration information of a serving cell;

configuration information of an uplink resource;

configuration information of a downlink resource; and configuration information of a flexible resource.

In some embodiments, the uplink-sending configuration information includes at least one of the following configuration information:

a PRACH, an SRS, a PUSCH, and a PUCCH; and the downlink-receiving configuration information includes at least one of the following configuration information:

a PDSCH, a CSI-RS, and a PDCCH.

In some embodiments, configuration information of a deactivated secondary cell in the plurality of serving cells is not used to determine whether there is a conflicting time resource in the plurality of serving cells.

In some embodiments, for the deactivated secondary cell in the plurality of serving cells, all time resources of the deactivated secondary cell are flexible time resource symbols.

In some embodiments, the processor 901 is further configured to:

determine, based on activation information of a secondary cell, a reference serving cell in the plurality of serving cells.

In some embodiments, the reference serving cell is: an activated cell with the lowest cell index value in the plurality of serving cells, where the activated cell includes:

an activated secondary cell; or a primary cell and an activated secondary cell.

In some embodiments, the plurality of serving cells are in one frequency band or in one frequency band combination.

In some embodiments, in a case that the terminal receives the activation command, the activated secondary cell includes a secondary cell activated by the activation command; or in a case that the terminal receives the deactivation command, the activated secondary cell does not include a secondary cell deactivated by the deactivation command.

In some embodiments, in a case that the terminal receives the activation command:

in a first time, the activated secondary cell includes a secondary cell activated by the activation command; and/or in a second time, the activated secondary cell does not include a secondary cell activated by the activation command, where a difference between the first time and a receiving time of the activation command is greater than or equal to a T1 time, a difference between the second time and the receiving time of the activation command is less than or equal to the T1 time, and the T1 time is a delay for activating the secondary cell.

In some embodiments, a time resource of the secondary cell activated by the activation command at the second time is a flexible time resource.

In some embodiments, in a case that the terminal receives the deactivation command:

in a third time, the activated secondary cell includes a secondary cell deactivated by the deactivation command; and/or in a fourth time, the activated secondary cell does not include a secondary cell deactivated by the deactivation command, where a difference between the third time and a receiving time of the deactivation command is less than or equal to a T2 time, a difference between the fourth time and the receiving time of the deactivation command is greater than or equal to the T2 time, and the T2 time is a delay for deactivating the secondary cell.

In some embodiments, a time resource of the secondary cell deactivated by the deactivation command at the fourth time is a flexible time resource.

In some embodiments, all time resources of a dormant secondary cell in the plurality of serving cells are flexible time resources, where the dormant secondary cell is in an active state, and an activated BWP is a secondary cell of a dormant BWP.

In some embodiments, all the time resources include:

a downlink time resource and an uplink time resource configured on a network side.

In some embodiments, in a case that the terminal determines a reference serving cell in the plurality of serving cells, configuration information of a dormant secondary cell in the plurality of serving cells is not used; or the terminal determines, based on configuration information of an activated cell in the plurality of serving cells, a reference serving cell in the plurality of serving cells, the activated cell includes: an activated secondary cell, or a primary cell and an activated secondary cell, and the activated secondary cell is a non-dormant secondary cell;

and/or configuration information of a dormant secondary cell in the plurality of serving cells is not used to determine whether there is a conflicting time resource in the plurality of serving cells; or the terminal determines, based on configuration information of an activated cell in the plurality of serving cells, whether there is a conflicting time resource in the plurality of serving cells of the terminal, where the activated cell includes: an activated secondary cell, or a primary cell and an activated secondary cell, and the activated secondary cell is a non-dormant secondary cell, where the dormant secondary cell is in an active state, and an activated BWP is a secondary cell of a dormant BWP.

In some embodiments, the configuration information of the dormant secondary cell includes at least one of the following:

configuration information of an uplink resource;

configuration information of a downlink resource;

configuration of PDCCH monitoring;

transmission configuration of an SPS PDSCH;

transmission configuration of a configured grant PUSCH;

transmission configuration of a PRACH;

transmission configuration of a CSI-RS;

transmission configuration of an SRS; and transmission configuration of a PUCCH.

In some embodiments, the CSI-RS is not used for at least one of the following:

RRM measurement, BFD, and CSI measurement.

In some embodiments, the SRS is an SRS with a cycle greater than or equal to a cycle threshold, and the cycle threshold is preset or indicated by a network.

The foregoing network device may determine, based on the activation information of the secondary cell of the terminal, whether there is a conflicting time resource in a plurality of serving cells of the terminal.

The transceiver 902 is configured to receive and transmit data under the control of the processor 901. The transceiver 902 includes at least two antenna ports.

In FIG. 9, a bus architecture may include any quantity of interconnected buses and bridges, and is linked by various circuits of one or more processors represented by the processor 901 and a memory represented by the memory 903. The bus architecture may further link various other circuits such as a peripheral device, a voltage regulator, and a power management circuit together. These are all well-known in the art, and therefore are not further described in this specification. The bus interface provides interfaces. The transceiver 902 may be a plurality of elements, in other words, includes a transmitter and a receiver, and provides a unit configured to communicate with various other apparatuses on a transmission medium. For different user equipment, the user interface 904 may further be an interface that can be externally or internally connected to a required device. The connected device includes but is not limited to a keypad, a display, a loudspeaker, a microphone, a joystick, and the like.

The processor 901 is responsible for managing the bus architecture and common processing, and the memory 903 may store data used when the processor 901 performs an operation.

An embodiment of the present disclosure further provides a network device, including a processor 901, a memory 903, and a computer program stored in the memory 903 and executable on the processor 901. When the computer program is executed by the processor 901, processes of the method embodiment for determining a conflicting resource are implemented, and a same technical effect can be achieved. To avoid repetition, details are not described herein again.

An embodiment of the present disclosure provides a computer-readable storage medium. The computer-readable storage medium stores a computer program, and when the computer program is executed by a processor, steps of the method for determining a conflicting resource that is applied to the terminal and that is provided in the embodiments of the present disclosure are implemented, or when the computer program is executed by a processor, steps of the method for determining a conflicting resource that is applied to the network device and that is provided in the embodiments of the present disclosure are implemented, and a same technical effect can be achieved. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is an exemplary implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above implementations, and the above implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A method for determining a conflicting resource, performed by a terminal, comprising:

determining, based on activation information of a secondary cell (Scell) in a plurality of serving cells of the terminal, whether, on a same time resource, a first serving cell is configured with an uplink time resource or uplink transmitting and a second serving cell is configured with a downlink time resource or downlink receiving, wherein the plurality of serving cells of the terminal comprise the first serving cell and the second serving cell, wherein the activation information of the Scell comprises a state of the Scell, wherein the state of the Scell comprises: an active state or a deactivated state; and in response to determining that, on the same time resource, the first serving cell is configured with the uplink time resource or the uplink transmitting and the second serving cell is configured with the downlink time resource or the downlink receiving, determining, based on the activation information of the Scell, a reference serving cell in the plurality of serving cells of the terminal, and determining not to perform uplink transmitting in the first serving cell or downlink receiving in the second serving cell based on the determined reference cell, wherein the determined reference serving cell is an activated cell with the lowest cell index value in the plurality of serving cells.

2. The method according to claim 1, wherein determining whether, on the same time resource, the first serving cell is configured with the uplink time resource or the uplink transmitting and the second serving cell is configured with the downlink time resource or the downlink receiving comprises:

determining whether, on the same time resource, the first serving cell is configured with the uplink time resource and the second serving cell is configured with the downlink time resource; or determining whether, on the same time resource, the first serving cell is configured with the uplink transmitting and the second serving cell is configured with the downlink receiving; or determining whether, on the same time resource, the first serving cell is configured with the uplink transmitting and the second serving cell is configured with the downlink time resource; or determining whether, on the same time resource, the first serving cell is configured with the uplink time resource and the second serving cell is configured with the downlink receiving.

3. The method according to claim 1, wherein the same time resource comprises at least one of the following: a symbol, a slot, or a subframe.

4. The method according to claim 1, wherein configuration information of a deactivated Scell in the plurality of serving cells is not used to determine whether, on the same time resource, the first serving cell is configured with the uplink time resource or the uplink transmitting and the second serving cell is configured with the downlink time resource or the downlink receiving.

5. The method according to claim 1, wherein for a deactivated Scell in the plurality of serving cells, all time resources of the deactivated Scell are flexible time resources.

6. The method according to claim 1, wherein the plurality of serving cells are in one frequency band or in one frequency band combination.

7. The method according to claim 1, wherein determining, based on the activation information of the secondary cell, whether, on the same time resource, the first serving cell is configured with the uplink time resource or the uplink transmitting and the second serving cell is configured with the downlink resource and the downlink receiving comprises:

determining whether, on the same time resource, the first serving cell is configured with the uplink time resource or the uplink transmitting and the second serving cell is configured with the downlink time resource or the downlink receiving based on configuration information of an activated cell in the plurality of serving cells, wherein the activated cell comprises:

an activated Scell, or a primary cell and an activated Scell.

8. The method according to claim 7, wherein the configuration information of the activated cell in the plurality of serving cells comprises at least one of the following:

uplink-transmitting configuration information of an activated uplink Bandwidth Part (BWP);

downlink-receiving configuration information of an activated downlink BWP;

uplink-transmitting configuration information of a serving cell;

downlink-receiving configuration information of a serving cell;

configuration information of an uplink resource;

configuration information of a downlink resource; or configuration information of a flexible resource.

9. The method according to claim 8, wherein the uplink-transmitting configuration information comprises at least one of the following configuration information:

a Physical Random Access Channel (PRACH), a Sounding Reference Signal (SRS), a Physical Uplink Shared Channel (PUSCH), or a Physical Uplink Control Channel (PUCCH); and the downlink-receiving configuration information comprises at least one of the following configuration information:

a Physical Downlink Shared Channel (PDSCH), a Channel State Information Reference Signal (CSI-RS), or a Physical Downlink Control Channel (PDCCH).

10. The method according to claim 1, wherein the activated cell comprises:

an activated Scell; or a primary cell and an activated Scell.

11. A method for determining a conflicting resource, performed by a network device, comprising:

determining, based on activation information of a secondary cell (Scell) in a plurality of serving cells of a terminal, whether, on a same time resource, a first serving cell is configured with an uplink time resource or uplink transmitting and a second serving cell is configured with a downlink time resource or downlink receiving, wherein the plurality of serving cells of the terminal comprise the first serving cell and the second serving cell, wherein the activation information comprises a state of the Scell, wherein the state of the Scell comprises: an active state or a deactivated state; and in response to determining that, on the same time resource, the first serving cell is configured with the uplink time resource or the uplink transmitting and the second serving cell is configured with the downlink time resource or the downlink receiving, determining, based on the activation information of the Scell of the terminal, a reference serving cell in the plurality of serving cells of the terminal, and determining not to perform uplink transmitting in the first serving cell or downlink receiving in the second serving cell based on the determined reference cell, wherein the reference serving cell is an activated cell with the lowest cell index value in the plurality of serving cells.

12. The method according to claim 11, wherein determining whether, on the same time resource, the first serving cell is configured with the uplink time resource or the uplink transmitting and the second serving cell is configured with the downlink time resource or the downlink receiving comprises:

determining whether, on the same time resource, the first serving cell is configured with the uplink time resource and the second serving cell is configured with the downlink time resource; or determining whether, on the same time resource, the first serving cell is configured with the uplink transmitting and the second serving cell is configured with the downlink receiving; or determining whether, on the same time resource, the first serving cell is configured with the uplink transmitting and second serving cell is configured with the downlink time resource; or determining whether, on the same time resource, the first serving cell is configured with the uplink time resource, and the second serving cell is configured with the downlink receiving.

13. A network device, comprising: a memory having a computer program stored thereon, and a processor, wherein the computer program, when executed by the processor, causes the processor to perform the method of claim 11.

14. The method according to claim 11, wherein determining, based on the activation information of the secondary cell, whether, on the same time resource, the first serving cell is configured with the uplink time resource or the uplink transmitting and the second serving cell is configured with the downlink time resource or the downlink receiving comprises:

determining whether, on the same time resource, the first serving cell is configured with the uplink time resource or the uplink transmitting and the second serving cell is configured with the downlink time resource or the downlink receiving based on configuration information of an activated cell in the plurality of serving cells, wherein the activated cell comprises:

an activated Scell; or a primary cell and an activated Scell.

15. A terminal, comprising: a memory having a computer program stored thereon, and a processor, wherein the computer program, when executed by the processor, causes the processor to perform a method for determining a conflicting resource, comprising:

determining, based on activation information of a secondary cell (Scell) in a plurality of serving cells of the terminal, whether, on a same time resource, a first serving cell is configured with an uplink time resource or uplink transmitting and a second serving cell is configured with a downlink time resource or downlink receiving, wherein the plurality of serving cells of the terminal comprise the first serving cell and the second serving cell, wherein the activation information of the Scell comprises a state of the Scell, wherein the state of the Scell comprises: an active state or a deactivated state; and in response to determining that, on the same time resource, the first serving cell is configured with the uplink time resource or the uplink transmitting and the second serving cell is configured with the downlink resource or the downlink receiving, determining, based on the activation information of the Scell, a reference serving cell in the plurality of serving cells of the terminal, and determining not to perform uplink transmitting in the first serving cell or downlink receiving in the second serving cell based on the determined reference cell, wherein the reference serving cell is an activated cell with the lowest cell index value in the plurality of serving cells.

16. The terminal according to claim 15, wherein determining whether, on the same time resource, the first serving cell is configured with the uplink time resource or the uplink transmitting and the second serving cell is configured with the downlink time resource or the downlink receiving comprises:

determining whether, on the same time resource, the first serving cell is configured with the uplink time resource, and the second serving cell is configured with the downlink time resource; or determining whether, on the same time resource, the first serving cell is configured with the uplink transmitting, and the second serving cell is configured with the downlink receiving; or determining whether, on the same time resource, the first serving cell is configured with the uplink transmitting, and the second serving cell is configured with the downlink time resource; or determining whether, on the same time resource, the first serving cell is configured with the uplink time resource, and the second serving cell is configured with the downlink receiving.

* * * * *